US011006164B2

(12) United States Patent
Clift

(10) Patent No.: US 11,006,164 B2
(45) Date of Patent: May 11, 2021

(54) TV AND ELECTRONIC DEVICE WITH EXTERNAL TUNER AND MEMORY FOR PERSONAL VIDEO RECORDING

(71) Applicant: Sony Corporation, Tokyo (JP)

(72) Inventor: Graham Clift, San Diego, CA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/199,095

(22) Filed: Nov. 23, 2018

(65) Prior Publication Data

US 2020/0169775 A1    May 28, 2020

(51) Int. Cl.
| | | |
|---|---|---|
| *H04N 5/935* | (2006.01) | |
| *H04N 5/932* | (2006.01) | |
| *H04N 21/4147* | (2011.01) | |
| *H04N 21/418* | (2011.01) | |
| *H04N 21/438* | (2011.01) | |
| *H04N 21/6587* | (2011.01) | |
| *H04N 5/76* | (2006.01) | |
| *H04N 5/84* | (2006.01) | |
| *H04N 5/89* | (2006.01) | |

(52) U.S. Cl.
CPC ..... *H04N 21/4147* (2013.01); *H04N 21/4184* (2013.01); *H04N 21/4382* (2013.01); *H04N 21/6587* (2013.01)

(58) Field of Classification Search
USPC ....... 386/211, 214, 217, 220, 291, 326, 332, 386/334
See application file for complete search history.

(56) References Cited

U.S. PATENT DOCUMENTS

| | | | |
|---|---|---|---|
| 2005/0190917 A1* | 9/2005 | Noh | H04N 7/163 380/239 |
| 2005/0201720 A1* | 9/2005 | Toyoshima | H04N 21/47214 386/234 |
| 2012/0183276 A1* | 7/2012 | Quan | H04N 21/26291 386/244 |
| 2018/0048941 A1* | 2/2018 | Kitazato | H04H 20/59 |

* cited by examiner

*Primary Examiner* — Daquan Zhao
(74) *Attorney, Agent, or Firm* — Oblon, McClelland, Maier & Neustadt, L.L.P.

(57) ABSTRACT

An information processing apparatus includes a communication interface configured to connect to a tuner device. The information processing apparatus further includes processing circuitry configured to receive, from the tuner device, data packets corresponding to an Advanced Television Systems Committee (ATSC) 3.0 service included in a digital broadcast signal, determine whether an indication to pause the ATSC 3.0 service is received, and in response to a determination that the indication to pause the ATSC 3.0 service is received, stop reading, from a first memory of the tuner device, subsequent data packets corresponding to the ATSC 3.0 service.

15 Claims, 20 Drawing Sheets

PLP #1*

PLP #2

PLP #3*

PLP #4*

PLP #5

PLP #6*

FIG. 9

TV AND ELECTRONIC DEVICE WITH EXTERNAL TUNER AND MEMORY FOR PERSONAL VIDEO RECORDING

BACKGROUND

Technical Field

The present disclosure relates generally to an application for implementing additional television broadcast receiver and personal video recording (PVR) functionality in TV and electronic devices.

Description of the Related Art

In the U.S., digital televisions are capable of receiving digital television broadcast signals conforming to Advanced Television Systems Committee (ATSC) 1.0 standards. ATSC 3.0 is a new Digital Television (DTV) standard that offers support for newer technologies. An important feature of the ATSC 3.0 standard is the delivery of Internet Protocol (IP) packets over the broadcast emission for both signaling as well as content, with the design goal that protocols used are as close as possible to those used in the Internet. As a benefit of this approach, the ATSC 3.0 standards support over-the-top (OTT) delivery of TV content and signaling as an adjunct to content delivered via the broadcast path. OTT delivery may include the delivery of television content through the user's broadband internet connection. "Hybrid" services are possible in which some components are delivered by broadcast and others (e.g., additional audio language or web-based application content) are delivered via broadband.

Various types of consumer electronic device including standard television sets, tablet computers, and personal computers include the inherent ability to decode and display audio, video, and graphics. Some broadcasting stations have developed applications, which provide specialized content for viewing on mobile devices, typically smartphones and tablets. This specialized content may be distributed from a server, or server system, by way of unicast transmission (i.e., one-to-one). Although platforms such as smartphones and tablets can have applications installed for video streaming, and larger screen computers such as laptops and desktops can view video streaming through a Web browser, there is a need to develop an implementation of ATSC 3.0 receiver functionality within these types of electronic devices, including the ability to provide personal video recording (PVR) functionality.

SUMMARY

According to an embodiment of the present disclosure there is provided an information processing apparatus a communication interface configured to connect to a tuner device. The information processing apparatus further includes processing circuitry configured to receive, from the tuner device, data packets corresponding to an Advanced Television Systems Committee (ATSC) 3.0 service included in a digital broadcast signal, determine whether an indication to pause the ATSC 3.0 service is received, and in response to a determination that the indication to pause the ATSC 3.0 service is received, stop reading, from a first memory of the tuner device, subsequent data packets corresponding to the ATSC 3.0 service.

According to an embodiment of the present disclosure, there is provided a tuner device that includes a communication interface configured to connect to an information processing apparatus. The tuner device further includes processing circuitry configured to receive a digital broadcast stream containing an Advanced Television Systems Committee (ATSC) 3.0 service, transmit data packets corresponding to the ATSC 3.0 service to the information processing apparatus, determine whether a write command is received from the information processing apparatus, and in response to the determination that the write command is received from the information processing apparatus, store subsequent data packets corresponding to the ATSC 3.0 service in a memory.

According to an embodiment of the present disclosure, there is provided an information processing apparatus that includes a communication interface configured to connect to a tuner device. The information processing apparatus further includes processing circuitry configured to receive, from the tuner device, data packets corresponding to a selected Advanced Television Systems Committee (ATSC) 3.0 service included in a digital broadcast signal, determine whether a user input for retrieval of data packets from a memory of the tuner device is received, and in response to a determination that the user input is received, send a command to the tuner device that causes the tuner device to retrieve, from the memory of the tuner device, data packets corresponding to the user input.

According to an embodiment of the present disclosure, there is provided an information processing apparatus including a communication interface configured to connect to a memory device. The information processing apparatus further includes processing circuitry configured to display an Advanced Systems Television Committee (ATSC) 3.0 service provided in a digital broadcast stream, detect the memory device, in response to the detection of the memory device, determine whether the memory device has a storage capacity that is equal to or greater than a memory threshold, in response to the determination that the storage capacity of the detected memory is equal to or greater than the memory threshold, determine whether a user has granted permission to use the memory for personal video recordings of data packets corresponding to the ATSC 3.0 service, and in response to the determination that the user has granted permission for the personal video recordings, enable the personal video recordings of the data packets corresponding to the ATSC 3.0 service using the memory.

According to an embodiment of the present disclosure, there is provided a non-transitory computer readable medium having instructions stored therein, which when executed by a processor in an information processing apparatus causes the processor to execute a method that includes receiving, from a tuner device connected via a communication interface to information processing apparatus, data packets corresponding to an Advanced Television Systems Committee (ATSC) 3.0 service included in a digital broadcast signal; determining whether an indication to pause the ATSC 3.0 service is received; and in response to a determination that the indication to pause the ATSC 3.0 service is received, stop reading, from the tuner device, subsequent data packets corresponding to the ATSC 3.0 service.

According to an embodiment of the present disclosure, there is provided a non-transitory computer readable medium having instructions stored therein, which when executed by a processor in an information processing apparatus causes the processor to execute a method that includes receiving, from a tuner device connected via a communication interface to information processing apparatus, data packets corresponding to a selected Advanced Television Systems Committee (ATSC) 3.0 service included in a digital broadcast signal; determining whether a user input for retrieval of data packets from a memory of the tuner device is received; and in response to a determination that the user input is received, send a command to the tuner device that causes the tuner device to retrieve, from the memory of the tuner device, data packets corresponding to the user input.

According to an embodiment of the present disclosure, there is provided a non-transitory computer readable medium having instructions stored therein, which when executed by a processor in an information processing apparatus causes the processor to execute a method that includes displaying an Advanced Systems Television Committee (ATSC) 3.0 service provided in a digital broadcast stream; detecting a memory device connected to the information processing apparatus via a communication interface; in response to the detection of the memory device, determining whether the memory device has a storage capacity that is equal to or greater than a memory threshold; in response to the determination that the storage capacity of the detected memory is equal to or greater than the memory threshold, determine whether a user has granted permission to use the memory for personal video recordings of data packets corresponding to the ATSC 3.0 service; and in response to the determination that the user has granted permission for the personal video recordings, enabling the personal video recordings of the data packets corresponding to the ATSC 3.0 service using the memory.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 illustrates exemplary physical layer pipes (PLPs).

DETAILED DESCRIPTION

Figure 1:
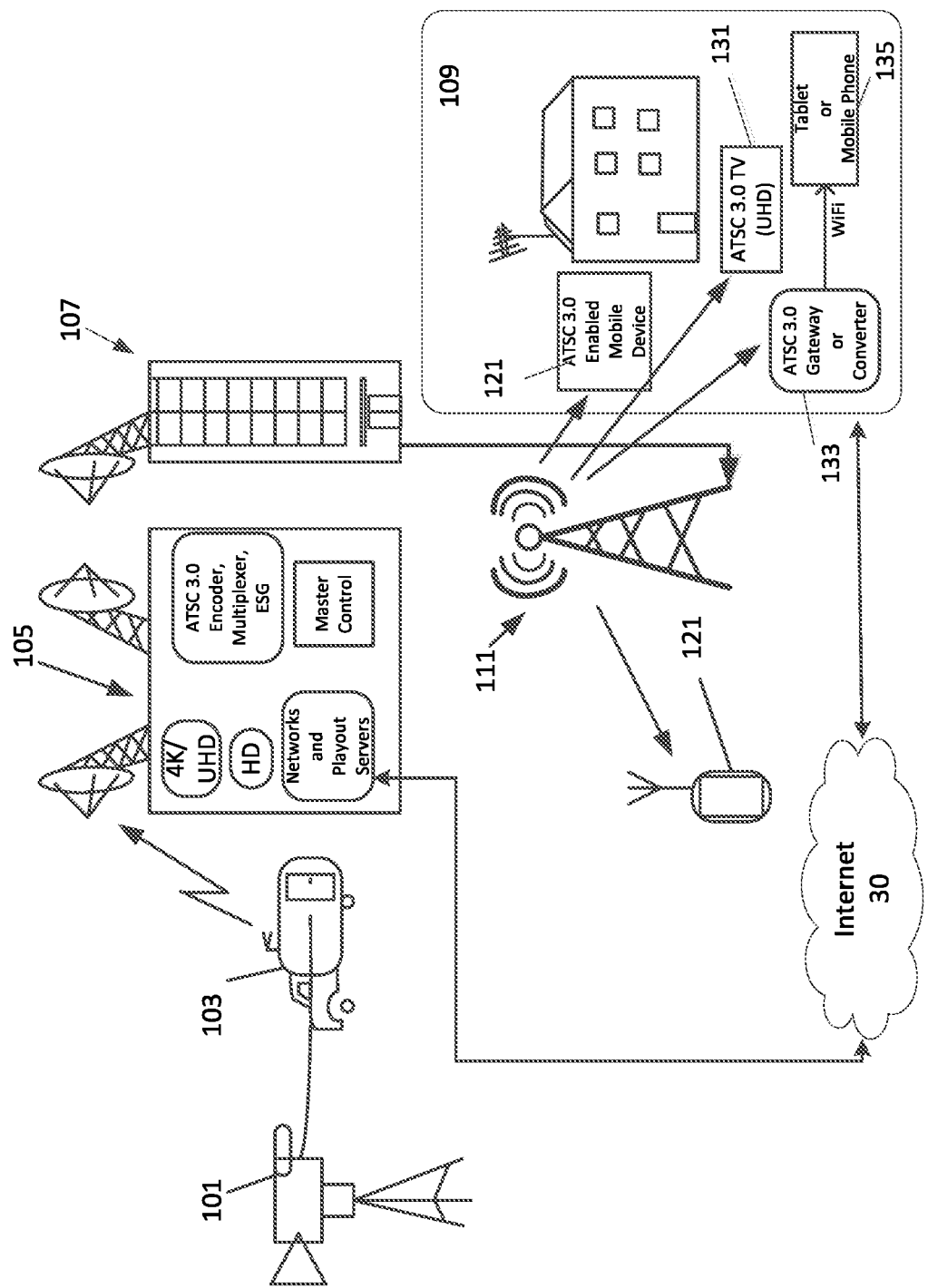
FIG. 1 is a schematic that shows basic components of a DTV system based on ATSC 3.0 standards.

Referring now to the drawings, wherein like reference numerals designate identical or corresponding parts throughout several views, the following description relates to an ATSC receiver that may be connected to an information processing apparatus. In certain embodiments, the information processing apparatus is an Android device such as a smartphone, tablet, or other consumer electronic device (such as a set-top box) that operates with a dedicated Android application used in conjunction with a hardware add-on in the form of a tuner device.

Each of the functions of the described embodiments may be implemented by processing circuitry, which includes one or more processing circuits. A processing circuit includes a programmed processor. In described embodiments, the programmed processor is an Advanced Reduced Instruction Set Computer (RISC) Machine (ARM) processor commonly found in Android-based smartphones and tablet computers that run the Android operating system. A processing circuit may also include devices such as an application specific integrated circuit (ASIC) and conventional circuit components arranged to perform the recited functions. Note that circuitry refers to a circuit or system of circuits. Herein, the circuitry may be in one computer system or may be distributed throughout a network of computer systems.

In the present disclosure, Android is a mobile operating system maintained by Google LLC and was designed primarily for touchscreen devices such as tablets and smartphones. Application software runs on an application framework which includes a Java library based on Open JDK. In the present disclosure, the version of USB used may be USB 2.0 or USB 3.0, which can accommodate a data transfer speed of up to 5 Gbit/s. First, a description is provided of a basic architecture of a broadcast television system based on ATSC 3.0.

Embodiments of the present disclosure are directed to implementing ATSC 3.0 functionality in electronic devices such as a smartphone, tablet, laptop, etc. These types of devices are considered as non-TV devices because while these devices can stream content, they do not have the capability to tune to a television broadcast without additional hardware and software. Furthermore, in other embodiments, electronic devices such as TVs can already receive ATSC 1.0 broadcasts, but cannot receive ATSC 3.0 broadcasts without external hardware. Furthermore, in other embodiments, an electronic device may already include an ATSC 3.0 tuner, but does not have memory for implementing PVR functionality.

Providing ATSC 3.0 TV functionality in an electronic device provides many significantly advantageous features. For example, when a user interacts with an ATSC DTV receiver, whether implemented in a regular DTV set or within a different device such as a smartphone or tablet, they may select a "service" for viewing.

In some embodiments, an ATSC "service" is a collection of media components and/or metadata delivered to receivers in aggregate. Components may be of multiple media types. A service may be either continuous or intermittent. A service can be real time or non-real time, where real time service can include a sequence of TV programs.

In ATSC 3.0, a service may or may not have live broadcast streaming audio/video content. A service may also include non-real-time content such as video-on-demand, or other interactive content like one might find on a web page. Also, some or all components of an ATSC 3.0 service may be delivered via the broadband (internet) path. A service that includes components from both broadcast and broadband is called a "hybrid" service.

FIG. 1 is a diagram showing an arrangement of basic components for an ATSC 3.0 system. Video technology is moving from High Definition (HD) digital television to advanced technologies, including video in 4K (a.k.a UHD) and 8K horizontal resolution, High Dynamic Range (HDR), wide color gamut, and high frame rate. Subsequently, the ATSC 3.0 system may include a digital video camera 101 that can capture Ultra High Definition (UHD) video, possibly remotely in conjunction with a mobile transmission unit 103 that provides a signal for a TV station 105. The TV station 105 includes, among other things, facilities for television production and broadcast control. Using ATSC 3.0, an encoder and multiplexer may generate IP packets for a television broadcast. The television broadcast may be transmitted with an Electronic Program Guide (EPG) to one or more transmitter sites 107. An ATSC 3.0 transmitter site may include an ATSC 3.0 waveform transmitter that transmits radio frequency (RF) signals via a tower transmit antenna 111. The ATSC 3.0 waveform may be picked up in a home, office building, library, shop or restaurant 109 by an ATSC 3.0 TV 131, an ATSC 3.0 Gateway or Converter 133, or an ATSC 3.0 enabled mobile device 121. A tablet or smartphone 135 may obtain the broadcast signal as a WiFi signal provided from the Gateway or Converter. Alternatively, outside a place of business or a home, Tablets, smartphones or other mobile devices 121 may pick up the broadcast waveform from a tower transmit antenna 111. Such mobile devices 121 may be used within a personal vehicle or within a mode of public transportation. Furthermore, the ATSC 3.0 Gateway and Networks and Playout Servers in TV station 105 may communicate with each other via Internet 30.

Mobile operating systems, such as the Android operating system developed by Google LLC or the iOS operating system developed by Apple Computer, are operating systems for phones, tablets, smartwatches, or other mobile devices and include features for mobile or handheld use. For example, mobile devices may include mobile features of cellular communication, Global Positioning System (GPS) navigation, video and/or single frame cameras, speech recognition, and typically a touchscreen. Examples of other mobile operating systems include Tizen, Windows 10 Mobile, etc. In particular, the Android operating system has been designed primarily for touchscreen devices. Typically, application software for the Android operating system runs on an application framework which includes a Java library based on Open JDK (Java Development Kit).

In the present disclosure, a DTV broadcaster, or simply broadcaster as used herein, relates to a local television station that transmits content via radio waves as a terrestrial television transmission.

An ATSC 3.0 system has a layered architecture defined as a physical layer, protocols layer, management layer, and applications and presentation layer. Details of the ATSC 3.0 system are found in, for example, ATSC Standard A/300- ATSC 3.0 System, dated Oct. 19, 2017), the entire contents of which are incorporated by reference (hereinafter A/300 Standard). At the transmitter side, the system architecture for an RF channel may include at least the following four main parts: Input Formatting, Bit Interleaved and Coded Modulation (BICM), Framing and Interleaving, and Waveform Generation. In the Input formatting and BICM parts, the Physical Layer Pipe (PLP) is a stream of data encoded with a specific modulation, code rate and length. There may be only a single PLP for an RF channel. The maximum number of PLPs in each RF channel is 64. The maximum number of PLPs in a frame carrying content is four. The input formatting part formats input data packets into output packets called ATSC Link Layer Protocol (ALP) packets. The length of each ALP packet is variable. The input formatting part maps the ALP packets to Baseband Packets, which include at least a header and a payload containing ALP packets. Baseband packets have fixed length, with the length determined by the outer code type, inner code rate and code length chosen for the target PLP.

In the ATSC 3.0 system, protocols were chosen to be aligned with standards developed for the internet and worldwide web, especially considering that ATSC 3.0 also supports "over the top," (OTT) or broadband delivery, of signaling and content. Hybrid services are also possible, in which some components are delivered via the broadcast path while others (for example interactive content or an alternative audio track) are delivered via broadband servers operated by the broadcaster.

An aspect of the present disclosure is a television receiver application that is configured to provide TV functionality in an electronic device. The television receiver application can be configured to receive ATSC 3.0 services, for example. The television receiver application may be implemented, for example, as a native Android application that has been built on top of the Android OS. The television receiver application may be written in a high-level programming language such as C/C++ and compiled for the hardware environment of a personal computer, or it may be written in the Java programming language for better portability to other hardware running the Android operating system (such as tablets, phones, or set-top boxes).

In some embodiments, the television receiver application is an ATSC 3.0 Android Application that the user downloads from the Google Play Store and launches to enjoy ATSC 3.0 TV receiver functionality. The television receiver application can detect the presence or absence of an ATSC 3.0 tuner device. If the tuner device is connected, the television receiver application offers the user the option of allowing the television receiver application to access and use the tuner device. If absent, the television receiver application may describe to the user the hardware device that is needed to be purchased or installed to be able to watch broadcast TV via the television receiver application.

If a tuner device is connected, the television receiver application may communicate with the tuner device to: (i) select an RF channel for tuning; (ii) if an ATSC 3.0 (or ATSC 1.0) broadcast emission is found on the selected RF frequency, provide an indication of the signal strength; (iii) receive ATSC Link-Layer Protocol (ALP) packets (see ATSC Standard: Link-Layer Protocol (A/330), Doc. A/330: 2016, dated Sep. 19, 2016, herein incorporated by reference in its entirety) from the tuned frequency, if it is an ATSC 3.0 signal; (iv) receive MPEG-2 Transport Stream packets (see ATSC A/53: ATSC Digital Television Standard, Parts 1-6, 2007, dated Jan. 3, 2007, herein incorporated by reference in its entirety), if it is an ATSC 1.0 signal; (v) select up to four PLP (Physical Layer Pipes) for processing (see ATSC Standard A/322-Physical Layer Protocol, dated Jun. 6, 2017, herein incorporated by reference in its entirety); (vi) use nonvolatile memory in the tuner device to store TV programs, including accessing files stored therein; and (vii) request to record one or more tuned ATSC 3.0 programs in the nonvolatile memory of the tuner device.

In some embodiments PLPs are data structures for carrying a data payload. Multiple PLPs can be used to carry different streams of data, all of which may be required to assemble a complete delivered product. In addition, data streams required to assemble multiple delivered products can share PLPs if those data streams are to be carried at the same levels of robustness.

As described in A/322, a broadcaster may choose one of several time interleaver modes for the delivery of any given PLP. These modes include no time interleaving, Convolutional Time Interleaving (CTI), and Hybrid Time Interleaving (HTI). Due to practical constraints on its design, for a receiver to process any PLP that uses CTI interleaver mode, all of its processing resources must be used. In contrast, for PLPs that use HTI interleaver mode (or no time interleaving), a practical receiver has sufficient resources to be able to process four such PLPs in parallel.

The television receiver application may also (i) further support a channel scan operation (as part of user initial setup, or at a later time) so that a full map of available services can be determined and saved; (ii) incorporate the necessary processing of ATSC 3.0 transport signaling; (iii) offer the user the navigation experience to be able to choose the ATSC 3.0 service of interest (this includes Electronic Service Guide displays); (iv) implement fast channel change; (v) manages all resources (beyond the tuner), including volatile and non-volatile memory, user input, and screen/display real estate; (vi) implement the ATSC 3.0 Interactive Services (application runtime) environment defined by ATSC Standard A/344-ATSC 3.0 Interactive Content, dated Dec. 18, 2017, herein incorporated by reference in its entirety; (vi) detect the presence or absence of the tuner device and respond accordingly; and (vii) implement user features such as PVR functionality, including record, play back, pause live TV, rewind, stop, and fast-forward a recorded service, as well as performing similar functions for real-time services (e.g., live TV programs). Details of an electronic device are next described.

Figure 2A:
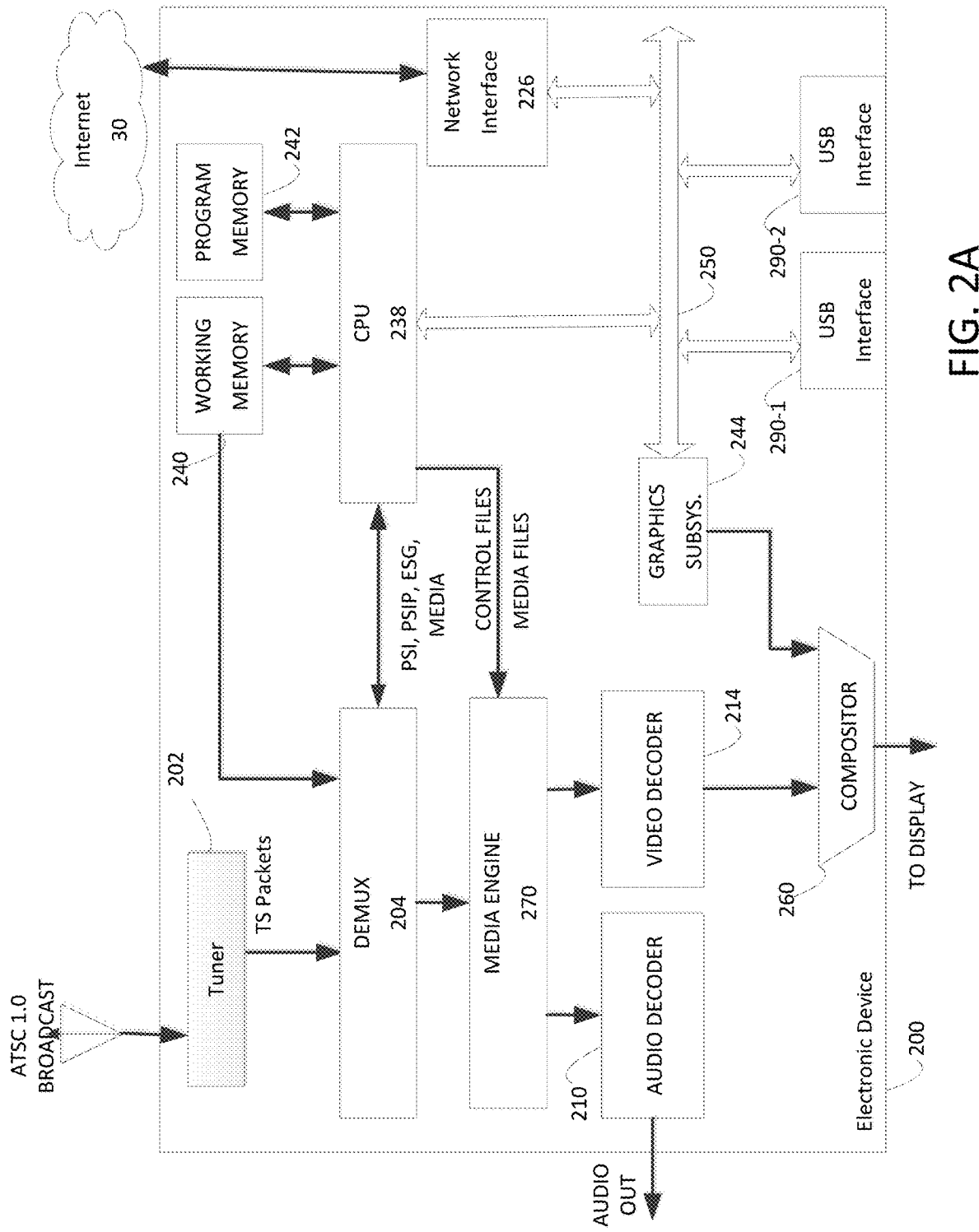
FIG. 2A illustrates an exemplary electronic device.

FIG. 2A illustrates an exemplary electronic device 200, which is configured to access television content (e.g., ATSC 1.0 broadcast) via a tuner device 202. The electronic device 200 may be a fixed device such as a set top box or a mobile or portable device such as a suitably equipped smartphone, tablet computer, laptop, or portable computer. In some embodiments, the electronic device does not include the tuner 202 and a demux 204 that outputs PSI, PSIP, and ESG data, and thus, is not able to receive ATSC 1.0 broadcasts.

The tuner device 202 includes receiver circuitry that is configured to receive a data stream (e.g., a broadcast stream) from one or more service providers. The electronic device 200 includes processing circuitry that is configured to perform various functions to operate the electronic device as a television. In one embodiment, a tuner device 202 receives broadcast emissions containing MPEG-2 Transport Stream (TS) packets. The tuner device 202 is configured to forward the TS packets to a demultiplexer 204, which are demultiplexed based on a Packet ID (PID) included in each TS packet. The output of the demultiplexer 204 is forwarded to a media engine 270 for decoding into separate audio and video (A/V) streams. The audio is decoded by an audio decoder 210 and the video is decoded by a video decoder 214.

The electronic device 200 generally operates under control of at least one processor, such as the CPU 238, which is coupled to a working memory 240, program memory 242, and a graphics subsystem 244 via one or more buses (e.g., bus 250). The graphics outputted by the graphics subsystem 244 are combined with video images by the compositor and video interface 260 to produce an output suitable for display on a video display. The CPU 238 operates to carry out functions of the electronic device 200 such as executing the television receiver application. The electronic device 200 further includes USB interfaces 290-1 and 290-2 that enable the CPU 238 and one or more external hardware devices to communicate with each other via the bus 250.

Figure 2B:
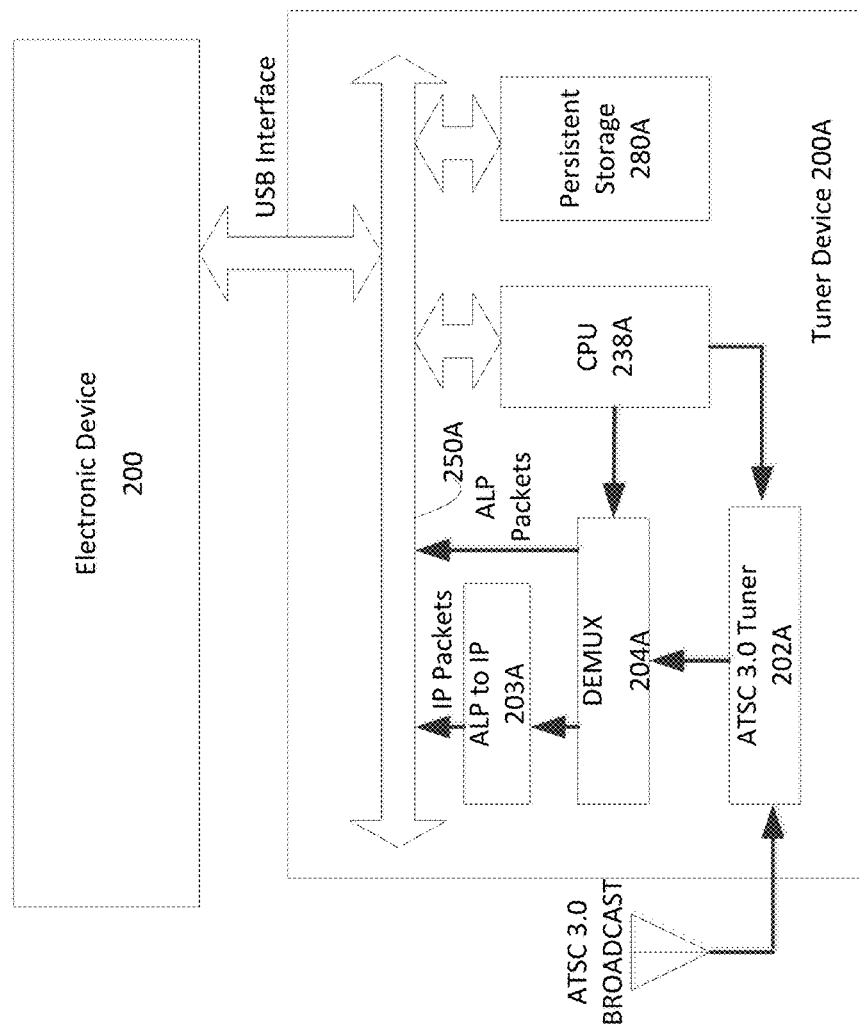
FIG. 2B illustrates an exemplary electronic device with an external tuner device.

FIG. 2B illustrates an embodiment in which the electronic device 200 is connected to a tuner device 200A. The electronic device 200 illustrated in FIG. 2B corresponds to the electronic device illustrated in FIG. 2A. The electronic device 200 may be configured to connect to the tuner device 200A via the USB interface 290-1 or interface 290-2. The tuner device 200A may connect to the electronic device 200 via other wireless (e.g., WiFi) or wired interfaces in other embodiments.

The tuner device 200A includes an ATSC 3.0 tuner 202A that is configured to receive a data stream (e.g., an ATSC 3.0 broadcast stream) from one or more service providers. Although the tuner device 200A illustrates one ATSC 3.0 tuner 202A, as understood by one of ordinary skill in the art, the tuner device 200A may include multiple tuners. In one embodiment, the ATSC 3.0 tuner 202A receives broadcast emissions containing the ATSC 3.0 broadcast stream that is forwarded to a demultiplexer 204A that demultiplexes the broadcast stream into ALP packets. The output of the demultiplexer 204A is forwarded to an ATSC 3.0 Link layer Protocol (ALP) to IP packet converter 203A to convert ALP packets to IP packets. IP packets output from the converter 203A may be forwarded to the electronic device 200 via the USB interface and bus 250A. The demultiplexer 204A may also be configured to forward the ALP packets to the electronic device 200 via the USB interface and bus 250A.

The tuner device 200A generally operates under control of at least one processor, such as the CPU 238A, which operates to carry out functions of the tuner device 200A. For example, the CPU 238A may control the tuner device 200A to execute commands received from the electronic device via the USB interface.

The tuner device 200A includes persistent storage 280A, which may be used to store data packets or files included in the received broadcast stream. For example, the tuner device 200A may receive a command from the electronic device 200 to store packets corresponding to a particular service included in the received ATSC 3.0 broadcast stream. The data stored in the persistent storage may be either ALP packets or IP packets. One advantage of storing ALP packets with respect to IP packets is that ALP packets require less memory space than IP packets since ALP is a compression method (e.g., IP header compression).

In one embodiment, files making up broadcaster applications can be delivered across the USB interface to the electronic device 200, which can interpret them to provide user interactivity with the ATSC 3.0 service.

In one embodiment, the collection of files making up the broadcaster application can be delivered over broadcast as packages, via the ROUTE protocol described in ATSC Standard A/331-Signaling, Delivery, Synchronization, and Error Protection, dated Dec. 6, 2017, for example and incorporated by reference in its entirety. An exemplary broadcaster application framework is described in ATSC A/344.

Figure 2C:
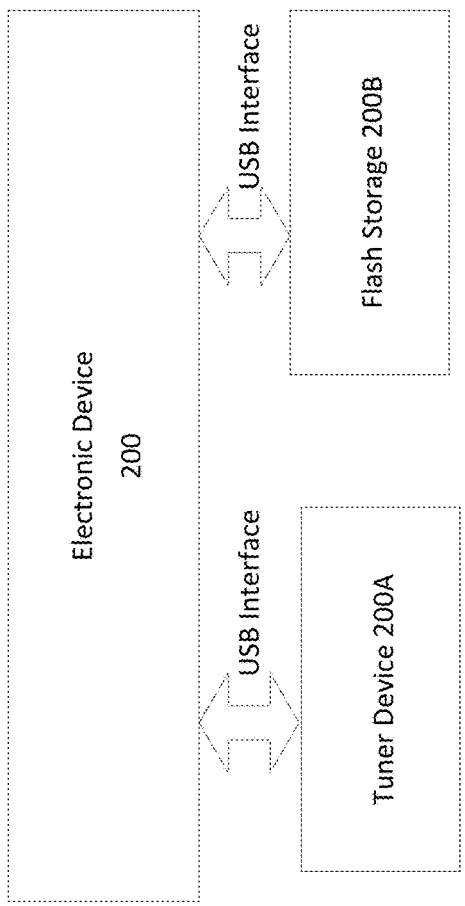
FIG. 2C illustrates an exemplary electronic device with an external tuner device and flash storage.

FIG. 2C illustrates an embodiment in which the electronic device 200A is connected to a tuner device 200A and a flash storage 200B (or other removable or external storage). The electronic device 200 illustrated in FIG. 2C corresponds to the electronic device illustrated in FIG. 2A. The tuner device 200A illustrated in FIG. 2C corresponds to the tuner device 200A illustrated in FIG. 2B. The tuner device 200A and flash storage 200B may be connected to the electronic device 200 via two separate USB interfaces. In other embodiments, the flash storage 200B may be connected to the tuner device 200A via a USB port included on the tuner device 200A. The tuner device 200A and flash storage 200B may connect to the electronic device 200 via other wireless (e.g., WiFi) or wired interfaces in other embodiments. In some embodiments, the flash storage 200B may be used to store data packets or media files and signaling included in a received ATSC 3.0 broadcast stream. In some embodiments, the tuner device 200A does not include any storage for storing data packets or media files and signaling included in the received ATSC 3.0 broadcast stream. In this scenario, the flash storage 200B may be used to store the content of services included in the received ATSC 3.0 broadcast stream. In some embodiments, when the tuner device 200A includes the persistent storage 280A, the flash storage 200B may serve as upgraded memory in which flash storage 200B provides storage capacity extended beyond that provided by persistent storage 280A alone (e.g., the flash storage 200B expands the available memory for PVR recordings). In some embodiments, PVR recordings from another memory (e.g., memory in electronic device 200, persistent storage 280A, memory from another external flash storage, etc.) may be transferred to the flash storage 200B.

Figure 3:
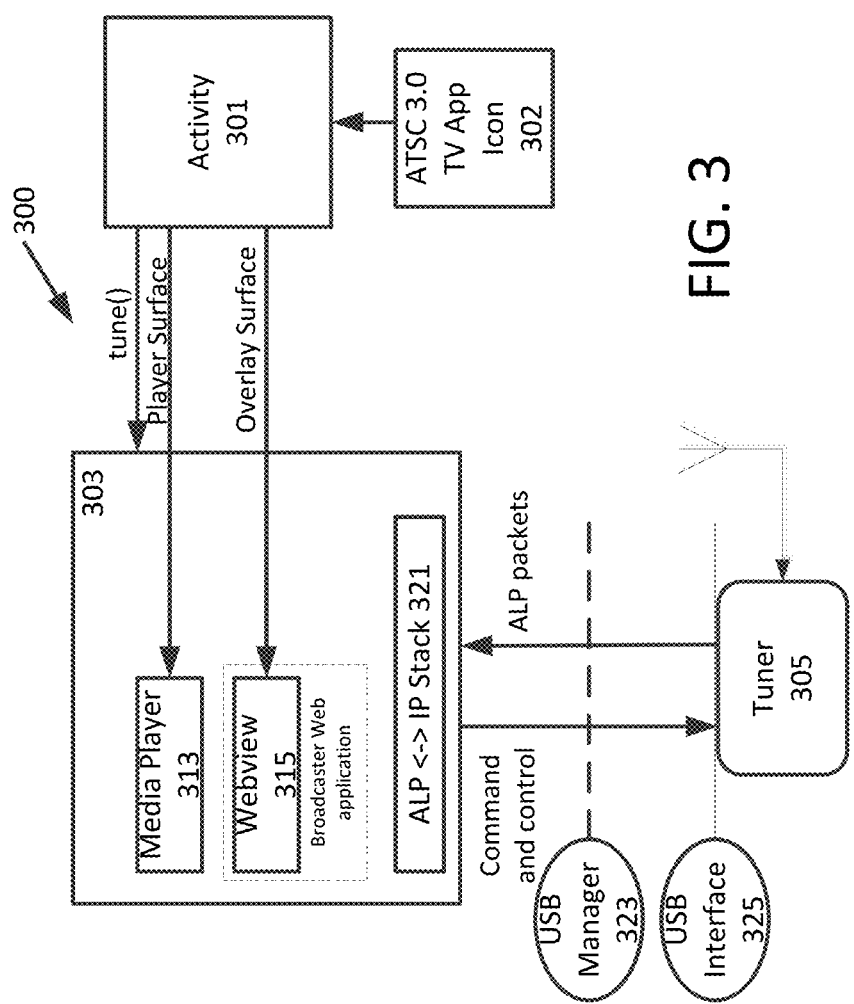
FIG. 3 is a block diagram for an exemplary ATSC 3.0 receiver.

FIG. 3 is a block diagram of an embodiment of an electronic device 300 having a television receiver application 303 such as an ATSC 3.0 television receiver application in an electronic device 300. The electronic device 300 includes an associated Android activity 301 component. When the user activates the television receiver application 303 in the electronic device 300, by selecting the "TV" input or by selecting, for example, an "ATSC 3.0 TV" icon 302 from an application tray, the activity 301 is launched. By that time, the television receiver application 303 is already running, and would have collected IP packets from the RF channel that is tuned to by a tuner device 305 if connected to the electronic device 300. Furthermore, the television receiver application 303 may also have the ability to begin retrieving audio, video, and caption packets from the broadcast and have them sent to media player 313 for decoding and rendering. The media player 313 may be an application level media player for Android, such as ExoPlayer. The media player 313 may also support Dynamic Adaptive Streaming over HTTP (DASH) and Common Encryption.

The activity 301 component can accept user input from a remote control unit (RCU) or keypad to support channel change or selection, which is reflected by the "tune( )" function. A function that may be performed by the activity 301 is to create two viewing surfaces that give the user a view of the video associated with the service (the "Player Surface") and any overlays (the "Overlay Surface") that a broadcaster application (e.g., HTML5 web application) might produce. The Player Surface may be handled by the media player 313, while the Overlay Surface may be handled by Webview 315.

In FIG. 3, the tuner device 305 is a hardware device that can tune to and demodulate an ATSC 3.0 broadcast signal, and produce a sequence of ALP packets. In some embodiments, the ALP packets are converted to IP packets in the tuner device 305 and the tuner device 305 passes the IP packets across the USB interface 325. In other embodiments, the ALP packets are passed across the USB interface 325 and are converted to IP packets by converter 321 in the television receiver application 303. When the ALP packets are passed across the USB interface 325, the link layer processing used to retrieve IP packets from ALP packets (mainly involving IP header decompression) can be done either within the tuner device 305 or within the television receiver application 303. The tuner device 305 may correspond to tuner device 200A (FIG. 2B).

In one embodiment, the tuner device 305 is an external USB-connected device that connects to the electronic device 300 via a USB port. Upon being launched, the television receiver application 303 may use a UsbManager Android Class 323.

The television receiver application 303 provides functionality allowing the rendering and display to the user of broadcast (and OTT) streaming video, as well as audio and closed captioning data. Furthermore, the television receiver application 303 may support a "runtime environment" through which broadcaster applications may be executed. A broadcaster application may include content that includes HTML markup, JavaScript, and CSS as specified in ATSC A/344 "ATSC 3.0 Interactive Content." In addition to functionality supported by standard web browsers, additional functionality may be incorporated by means of a Web Sockets protocol. The Web Sockets APIs specified in A/344 add support for capabilities including access to tuning functions, memory management, interaction between the broadcaster application and the receiver's media player (RMP), among many others.

In some embodiments, a broadcaster web application may be provided by a broadcaster as an adjunct to a regular streaming broadcast television service to provide interactivity or to operate in the background, for example, to monitor the user's usage of the service. Furthermore, the broadcaster may define a type of service that is presented as the output of the broadcaster application that is associated with that service. Such services cannot be offered by an ATSC 3.0 receiver that does not support the A/344 interactive content specification.

In some embodiments, an electronic device may be any device implemented on the Android OS platform, for example. A television receiver application has either been pre-installed by the manufacturer of the device, or the user has downloaded and installed the television receiver application from an application store such as the Google Play Store.

Figure 4:
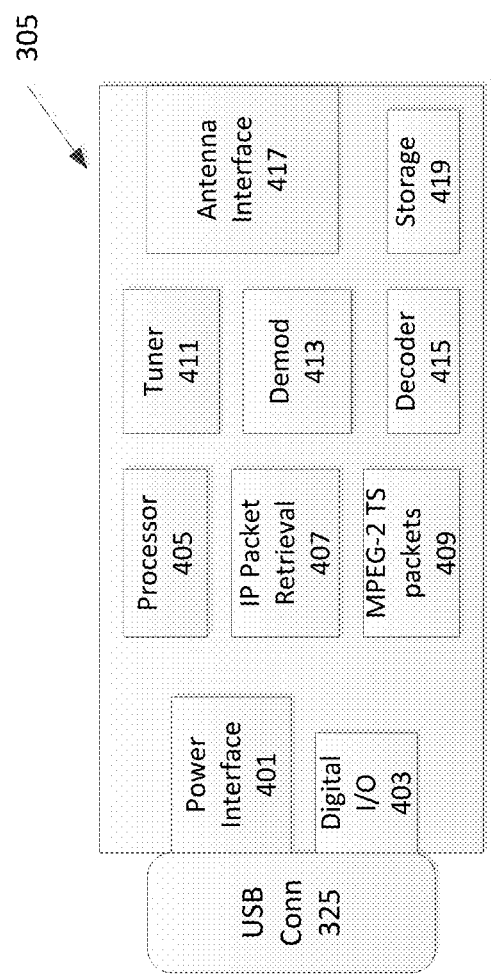
FIG. 4 illustrates an exemplary tuner device with a Universal Serial Bus (USB) interface.

FIG. 4 is a block diagram of an embodiment of a tuner device 305 in accordance with an exemplary aspect of the disclosure. In some embodiments, the tuner device 305 is a USB-connected dongle or the like which may receive power by way of a Power Interface 401 when the USB connector 325 is attached to a USB port. In other embodiments, the tuner device 305 may be battery operated and configured to provide power. Furthermore, in additional embodiments, the tuner device 305 may be configured to both receive and provide power.

In some embodiments, the tuner device 305 can receive an ATSC 3.0 broadcast signal or an ATSC 1.0 signal. An antenna interface circuit 417 receives the broadcast signal. A tuner 411 performs selective tuning to select a radio frequency (RF) of a television channel from within a band of transmitted RF signals. The television channel may have been detected through a channel scan process.

A processor 405 controls a demodulator circuit 413 and a decoder 415 to decode orthogonal frequency-division multiplexing (OFDM) symbols into one or more PLPs. ALP packets are obtained from the PLPs. In some embodiments, the decoder 415 performs High Efficiency Video Coding (HEVC) decoding. In some embodiments, the decoder 415 performs a scalability extended HEVC decoding (SHVC). In the case that the broadcast signal is an ATSC 1.0 broadcast signal, the processor 405 controls the demodulator 413 and decoder 415 to decode an MPEG transport stream. MPEG-2 Transport Stream (TS) packets 409 may be sent through the USB connector 325 via digital I/O 403.

In one embodiment, the tuner device 305 may perform IP packet retrieval 407 from ALP packets. The IP packets may be formatted according to User Datagram Protocol (UDP). Otherwise the function of converting ALP packets into IP packets may be performed by the device to which the tuner device 305 is connected. In some embodiments, the tuner device 305 includes storage 419 for storing services included in a received ATSC 3.0 broadcast stream.

Figure 5:
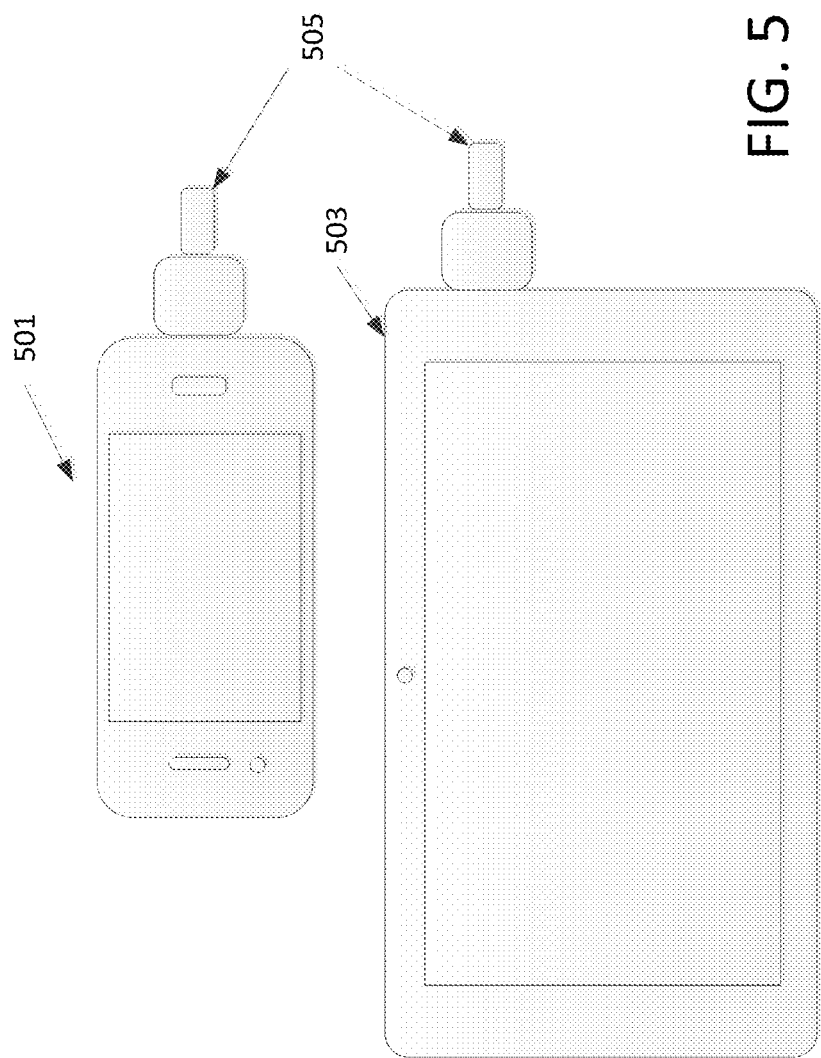
FIG. 5 is an exemplary arrangement of an information processing apparatus with a USB-connected tuner.

FIG. 5 is a schematic diagram that illustrates an embodiment of a smartphone 501 and a tablet computer 503 each having a tuner device 505 connected thereto. The tuner device 505 may include, or otherwise connect to, an antenna for picking up UHF frequencies and/or VHF frequencies.

Figure 6:
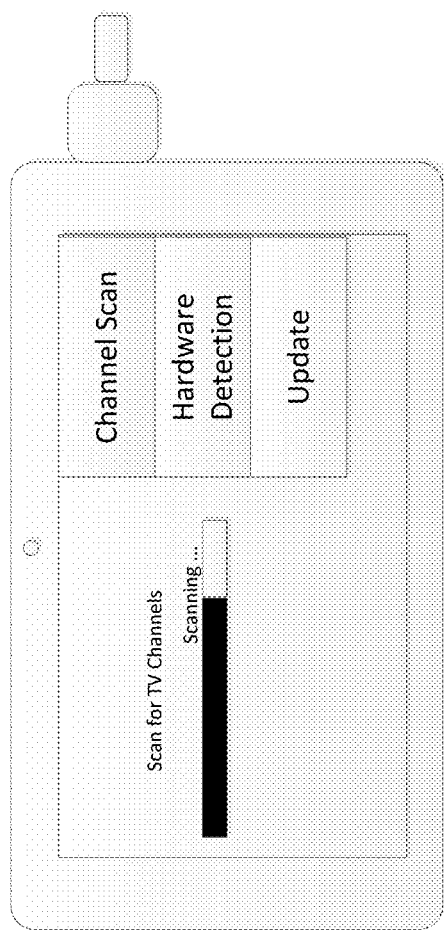
FIG. 6 is an exemplary screen for setting up an information processing apparatus for DTV reception using the USB-connected tuner.

FIG. 6 is a schematic diagram that shows an example screen that may be displayed during a channel scan operation. The screen may include a menu that offers options of selecting a channel scan, hardware detection, and check for updates.

Figure 7:
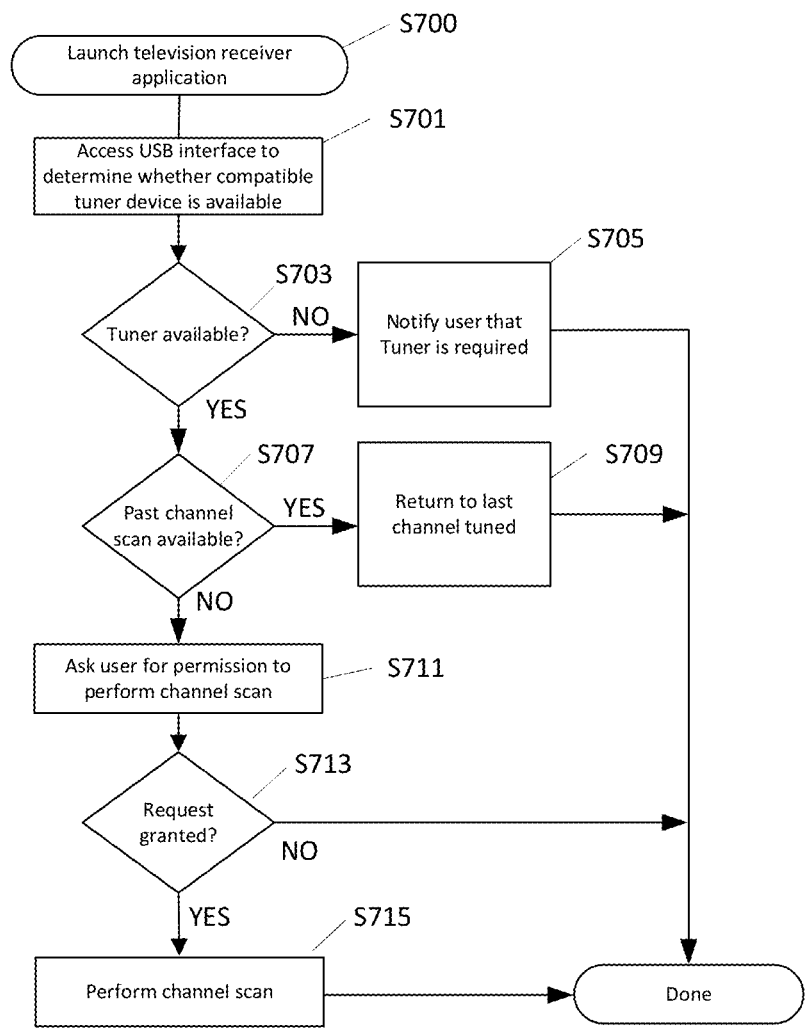
FIG. 7 is an exemplary flowchart of a process for launching a television receiver application.

FIG. 7 is a flowchart of an embodiment of a process for when the television receiver application is first launched. The process may start at step S700 where the television receiver application can be launched from the application tray as are any application on a smartphone (e.g., downloaded applications like Facebook, Twitter, Chrome, etc.). The television receiver application includes an Activity component which provides the experience the user interacts with when the application is launched. To provide the "watch TV" experience, the Activity component can request a full-screen video Player Surface.

The process proceeds to step S701, where the television receiver application accesses the USB interface to determine whether a tuner device is available. For example, via the UsbManager Android class, the television receiver application invokes UsbManager.getAccessoryList( ) method to determine whether a tuner device is available. The process proceeds to step S703, where the television receiver application processes the retrieved list of accessories to see if a compatible tuner device (e.g., ATSC 3.0 tuner device) has been connected to the USB interface as an accessory.

If no tuner device is available, the process proceeds from step S703 to step S705 to notify the user (e.g., by onscreen text) that the TV reception function depends on the availability of such an accessory and indicate possible model numbers and sources for such a device. When the notification is displayed in step S705, TV-related activities may be halted, and the process illustrated in FIG. 7 ends.

If a tuner device is available, the process proceeds from step S703 to step S707, where the television receiver application determines whether a past channel scan is available. If a record of a past channel scan is available, the process proceeds from step S707 to step S709, where the television receiver application issues a command to the tuner device to return to the last RF channel tuned, where the last accessed service is reacquired. The process in FIG. 7 is completed after all possible RF channels have been tuned and processed. If no record of the past channel scan is available, the process proceeds from step S707 to step S711 where the user is asked permission to perform a channel scan. A user may decide to delay the channel scan since the channel scan may be time consuming, or if the user knows that the antenna is currently not connected.

The process proceeds to step S713 to determine whether the user has granted the request to perform the channel scan. If the user has not granted the request to perform the channel scan, the process illustrated in FIG. 7 ends. However, if the user has granted the request to perform the channel scan, the process proceeds to step S715 to perform the channel scan. The process in FIG. 7 is completed after the channel scan is performed.

In some embodiments, the tuner device may be configured to deliver ALP packets across the USB interface, in which case both ALP packets containing IP packets as well as ALP packets containing Link Layer Signaling are provided to the television receiver application. The LMTs are delivered with the Link Layer Signaling packets.

In some embodiments, the tuner device is configured to convert ALP packets to IP packets. If the tuner device delivers IP packets across the USB interface, then one or more other methods are used to deliver the LMTs needed by the television receiver application to manage PLP selection. For example, in one method, the tuner device delivers each LMT in a UDP/IP packet with a specifically chosen IP source address and port number that does not conflict with any address/port number the broadcaster is allowed to use. In another method, the tuner device delivers packets containing LMTs in a separate stream across the USB interface (e.g., separate from the stream containing the IP packets associated with the broadcast). In another method, the tuner device delivers LMT data via command/control transactions via an application programming interface. For example, the television receiver application can request, via a command, the tuner device to provide the LMT data, where in response, the tuner device would respond with the LMT or an aggregated LMT if there are multiple LMT instances.

According to some embodiments, the television receiver application performs a channel scan when first installed or whenever the physical location of the electronic device is changed in such a way that some transmission signals that had been receivable before are no longer receivable, or some that had not been available are available at the new location. The channel scan involves, for example, an iterative operation in which each RF channel that might be broadcasting a television signal is tuned, in succession. At each frequency, if a television broadcast is found, Link Layer Signaling tables, Low Level Signaling tables, and Service Layer Signaling tables are retrieved and stored. After the channel scan, the user can "channel surf" through all the channels that have been found or can use "direct entry" to select a service of interest. For example, if a service associated with major/minor channel number 4.1 is found during the scan, "4.1" may be entered on the remote control or by whatever method of navigation is offered by the device.

Figure 8:
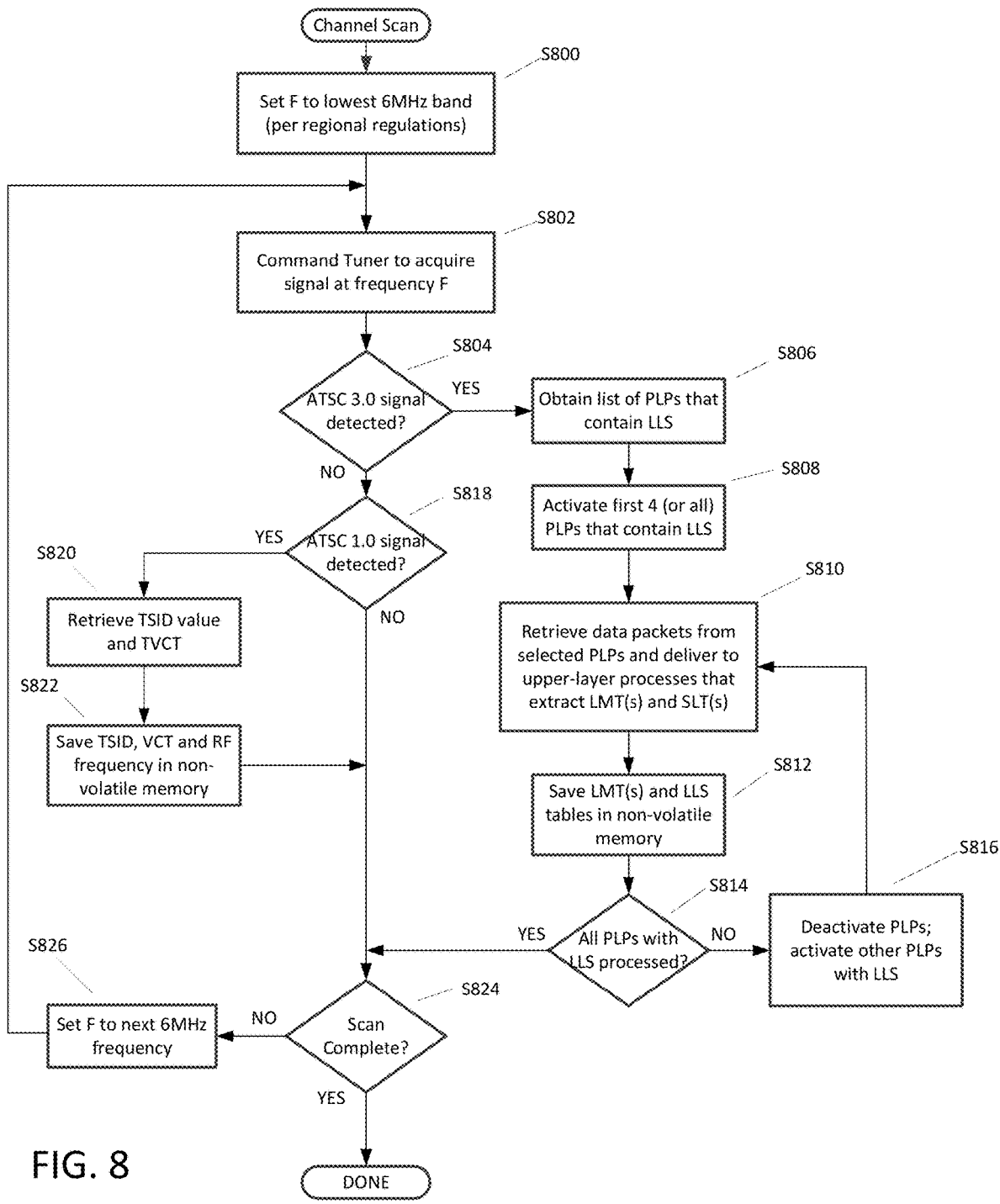
FIG. 8 is an exemplary flowchart of a process for performing a channel scan.

FIG. 8 is a flowchart of an embodiment of a channel scan operation. The process in FIG. 8 may be performed by an electronic device executing the television receiver application, where a tuner device is connected to the electronic device and receives instructions from the television receiver application for performing the channel scan operation. The process may generally start at step S800 where the television receiver application sets a frequency F at the lowest possible RF channel (e.g., 6 MHz) band that might be in use by a local broadcaster or mandated by regional regulations. The process proceeds to step S802 where the television receiver application sends a command to the tuner device to acquire a signal at the frequency F.

The process proceeds to step S804 to determine whether an acquired signal is an ATSC 3.0 signal. If the ATSC 3.0 signal is detected, the process proceeds to step S806 where a list of PLPs that contain low level signaling (LLS) are obtained. For example, if the ATSC 3.0 signal is detected, a physical layer frame is inspected to discover which PLP or PLPs contain LLS. Determining whether a PLP contains LLS may be performed by looking for a value of '1' (true) in a L1B_lls_flag in a physical layer frame, and then processing L1 Detail signaling to discover the PLP(s) which carry LLS. If the L1D_plp_lls_fiag is set to '1' for an associated L1D_plp_id value, that PLP ID is determined to carry LLS. For each PLP determined to carry LLS, the type of time interleaving can be determined by inspection of the value of the 2-bit L1-Detail signaling field L1D_plp_TI_mode. Therefore, the PLP IDs that are determined to carry LLS may be placed on a list provided to the television receiver application.

Figure 9:
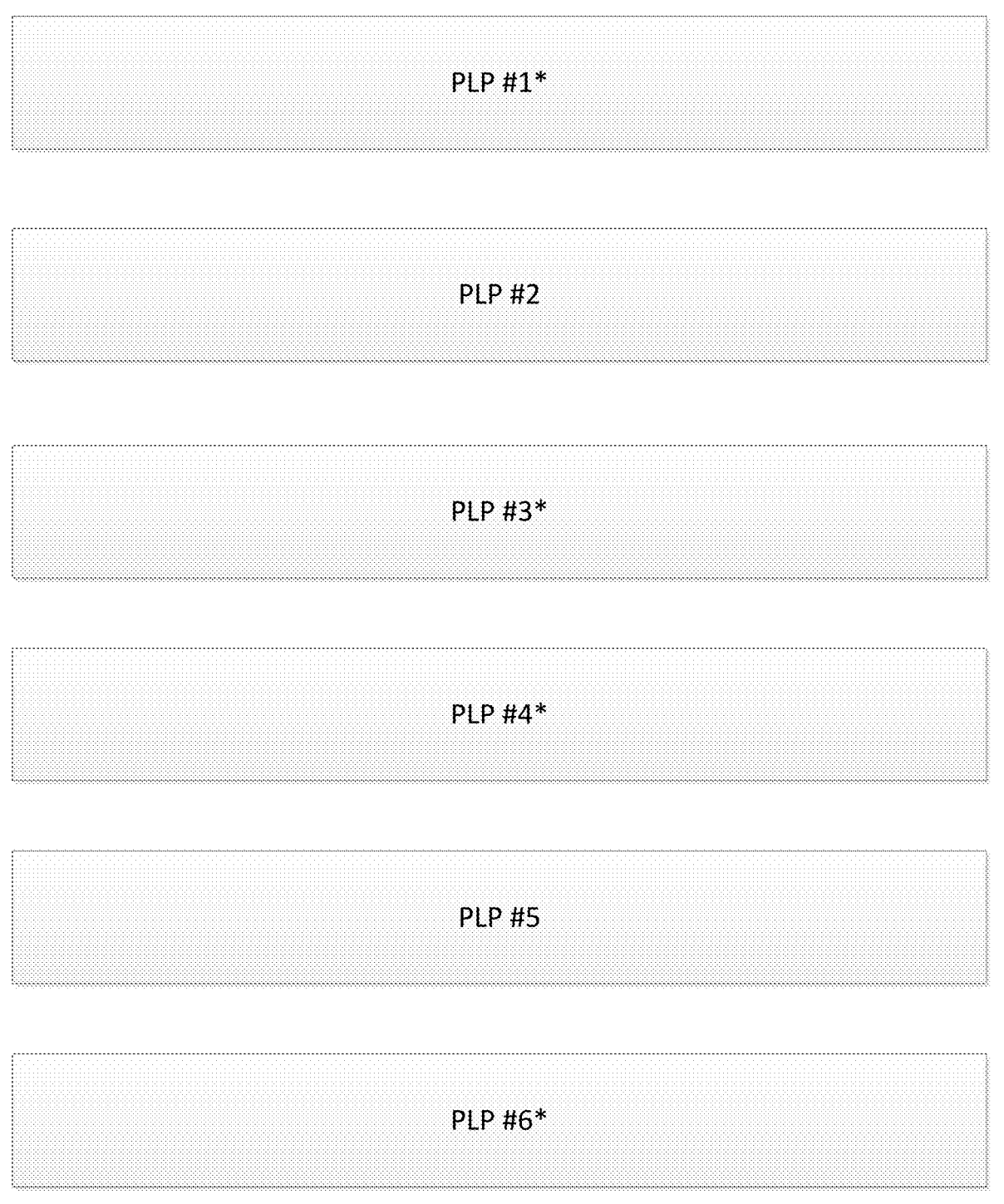

The process proceeds from step S806 to step S808 to active the first set of PLPs that are identified carrying the LLS. If all the PLPs in the broadcast emission carrying LLS are delivered using either HTI time interleaver mode or no time interleaving, then all the PLPs carrying the LLS will have been activated at step S808. If there is more than one PLP carrying LLS and one or more of those are delivered using CTI time interleaver mode, the PLPs may need to be processed sequentially. FIG. 9 illustrates example PLPs #1-#6 delivered using HTI time interleaver mode. In this figure, PLPs with a * are PLPs that carry LLS. Accordingly in this example, in step S808, PLPs #1, #3, #4, and #6 are selected. Although a maximum of four PLPs are activated in step S808, in other embodiments, any desired number of PLPs may be activated including more than four PLPs.

The process proceeds to step S810 where the television receiver application retrieves data packets from the selected PLPs, and the retrieved data packets are delivered to upper-layer processes that extract the LMT(s) and LLS tables such as a Service List Table (SLT). The SLT is defined in A/331.

The process proceeds to step S812, where the retrieved LMT(s) and LLS tables for the current RF channel are saved in non-volatile memory. Other signaling tables can be saved as well to speed up service acquisition. For example, Service Layer Signaling (SLS) tables such as the S-TSID can be saved and used on an interim basis during the early stages of service acquisition. Once SLS tables are retrieved upon acquisition, if any value that had been used during the early stages is found to have changed, a correction can be made at that time.

The process proceeds to step S814 to determine whether all the PLPs with the LLS are processed. For example, the tuner device may not be capable of processing more than four HTI time interleaved PLPs or more than one CTI time interleaved PLPs at any given time, and thus, the number of activated PLPs in step S808 may be limited by the number of PLPs that the tuner device can process at any given time.

If it is determined in step S814 that there are more PLPs with LLS left to be processed, the process proceeds to step S816 where the PLPs activated in step S808 are deactivated, and other PLPs carrying LLS tables are activated. For example, in step S816, up to 4 additional PLPs carrying LLS tables may be activated. The process proceeds from step S816 to step S810, where the process for step S810, and the steps executed thereafter, are repeated as described above.

If it is determined in step S814 that all the PLPs carrying LLS are processed, the process proceeds to step S824 to determine whether the channel scan is completed. If the channel scan is completed (e.g., all available RF channels have been scanned), the process illustrated in FIG. 8 is completed. However, if the channel scan is not completed, the process proceeds to step S826 where the television receiver application continues the channel scan operation by setting the frequency F to the next 6 MHz frequency. The proceeds to step S802, where the process described above for step S802, and the steps executed thereafter, are repeated as described above.

Returning to S804, if the ATSC 3.0 signal is not detected, the process proceeds to step S818 to determine whether the acquired signal is an ATSC 1.0 signal. If no ATSC 1.0 signal is detected, the process proceeds to step S824, where the process for step S824, and the steps executed thereafter, are repeated as described above.

If the ATSC 1.0 signal is detected, the process proceeds from step S818 to step S820 where the television receiver application retrieves the Transport Stream ID (TSID) and Terrestrial Virtual Channel Table (TVCT) for the detected ASTC 1.0 signal. A description for the TVCT is provided in the A/65 standard—"ATSC Standard: Program and System Information Protocol for Terrestrial Broadcast and Cable," dated Aug. 7, 2013, the entire contents of which are incorporated herein by reference.

The process proceeds to step S822 where the television receiver application saves the TSID, TVCT, and RF frequency for the detected ATSC 1.0 signal in memory. The process proceeds from step S818 to step S824, where the process for step S824, and the steps executed thereafter, are repeated as described above. In this regard, the process illustrated in FIG. 8 is completed when each available RF channel has been scanned.

According to some embodiments, "channel bonding" (see (i) ATSC Standard A/322-Physical Layer Protocol, dated Jun. 6, 2017, the entirety of which is incorporated herein by reference, (ii) A/321, and (iii) A/331) may be implemented when two or more tuners are available simultaneously to acquire a single service. When channel bonding is implemented, signaling in the PHY layer that points to transmission signals on other RF channels is saved, so that the second tuner can be used to retrieve data from the bonded parts.

In some embodiments, the USB interface 325 shown in FIG. 3 is a standard hardware interface known to one of ordinary skill in the art, and the operating system may utilize APIs known to anyone of ordinary skill in the art to manage this interface. For example, the ATSC 3.0 device may identify itself via a Device Descriptor (see Universal Serial Bus Specification, Revision 2.0, dated Apr. 27, 2000, the entirety of which is incorporated herein by reference) as an Audio/Video device (base class 10h). For an ATSC 3.0 tuner device 205 connected by USB, an API is used, in some embodiments, to extend the basic communication provided by the USB protocol.

In some embodiments, once the user has selected an ATSC 3.0 service for viewing, the television receiver application may be configured to implement "pause live TV" functionality and direct the tuner device to buffer received IP packets in the persistent storage of the tuner device. The amount of a service buffered (e.g., 30 to 60 minutes) is dependent on the available memory.

The presence of non-volatile memory, such as flash storage, in the tuner device allows for the storage of services (e.g., TV programming) to allow time-shifted playback. In the ATSC 3.0 broadcast system, the broadcast signal delivers IP packets containing signaling and audio/video/captioning and other data associated with TV Services. While some lower-layer signaling is delivered at the packet level (where one IP packet encapsulates one signaling table), most other components are organized as files. For example, one of the transport mechanisms defined in A/331 uses a broadcast form of ISO/IEC 23009-1 Dynamic Adaptive Streaming over HTTP (DASH) in which audio, video, and captions are delivered in "media segment" files. Each media segment may represent one or two (or more) seconds of media content.

A PVR recording of a service can be made in the tuner device by saving all the media segment files in a folder named after the title of the service or the time/channel it was recorded. For example, a first sequence of files may carry the video component, a second sequence of files may carry an associated audio component, and a third sequence of files may carry closed caption data. A service may have a broadcaster application (e.g., HTML5 application). The files associated with the broadcaster application may also be stored so that interactive functions provided by the broadcaster application may be offered when the user plays the service back on a time-shifted basis. Metadata may be stored as well, such as the Service Layer Signaling (SLS) tables that the broadcaster sends to identify, for the television receiver application, the location of the media files associated with the service.

In some embodiments, the tuner device enables the electronic device, which does not have native ATSC 3.0 capabilities, to access ATSC 3.0 broadcast signals. However, this tuner device does not have persistent storage to store services for time-shifted playback. The user can add flash storage via a second USB port (e.g., flash storage 200b, FIG. 2C). If the television receiver application detects the availability of flash storage, the television receiver application can request the user to grant the television receiver application permission to use the detected flash storage to add PVR functionality.

In some embodiments, the PVR functions of the television receiver application may be latent until the flash storage is made available. If the flash storage is not available, or if the detected flash storage does not meet predetermined size requirements, the television receiver application may notify the user that PVR functionality can be provided if appropriately-sized flash storage is connected to the electronic device. In some embodiments, if the electronic device is already ATSC 3.0 capable, addition by the user of an external flash storage USB device may unlock PVR functionality that is already latent in the television receiver application.

According to some embodiments, if the electronic device includes an additional USB port, the user could upgrade the PVR memory by plugging in a second flash storage device that is equal to or larger than a currently connected flash storage device. The system might also support USB-connected hard drives such as solid-state drives for even more storage capacity. Upon detection of the second flash storage device, the television receiver application may ask the user whether they want to keep the original memory device and use the new one for additional storage, or whether the user wants to transfer the files from the old storage device to the new storage device so that the user can remove the original storage device when the transfer is complete.

In some embodiments, the storage for recording services may be upgraded (e.g., from 64 to 128 GB) by the user including a larger memory module into a second USB slot. This larger memory module may be in addition to persistent storage included in a tuner device, or a previously connected external flash storage. In response to detection of the larger memory module, the television receiver application may ask whether the user wants to transfer recordings from the memory currently used for the recordings to the larger memory module.

In some embodiments, the tuner device may include a PVR enhanced television receiver application in the persistent storage. When the earlier version of the television receiver application detects the PVR enhanced television receiver application, the current television receiver application may allow the PVR enhanced television receiver application to be installed on the electronic device. The PVR enhanced television receiver application may take the place of the earlier version of the television receiver application to offer upgraded capabilities. For example, the earlier version of the television receiver application may not include PVR functionality whereas the PVR enhanced television receiver application includes PVR functionality that is "unlocked" once external storage meeting predetermined size requirements is detected.

Figure 10:
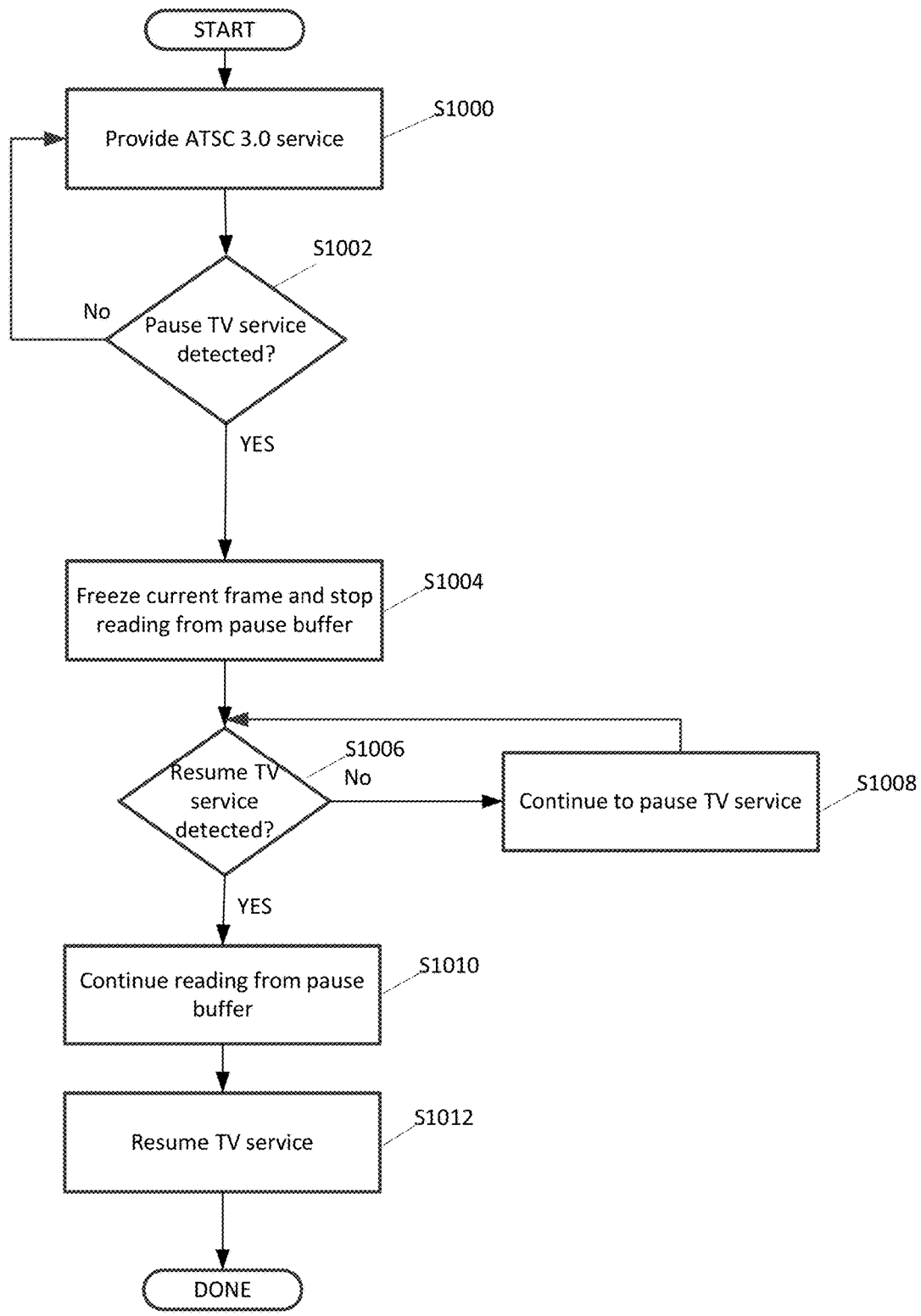
FIG. 10 is an exemplary flowchart of a process for providing PVR functionality with a tuner device.

FIG. 10 illustrates an embodiment of a process performed by the television receiver application for providing PVR functionality with a tuner device. The process illustrated in FIG. 10 may be performed after the channel scan process illustrated in FIG. 8 is performed. The process may generally start at step S1000 where an ATSC 3.0 service is provided to a user. For example, after the channel scan operation is performed, the user may select a TV service for viewing.

In step 1002, the television receiver application determines whether a pause TV service command is detected. For example, while the user is watching a live TV broadcast, the user may press a pause button on the electronic device or remote control to pause the live broadcast. If no pause TV service command is detected, the process returns to step S1000. If the pause TV service command is detected, the process proceeds to step S1004 where the television receiver application freezes a current frame being displayed and stops reading from the memory of the tuner device. While the TV service is paused, content for the paused service may be buffered in a pause buffer in the tuner device. The pause buffer may be a portion of the persistent storage of the tuner device (e.g., 280A) or, in other examples, consist of the entire persistent storage of the tuner device. When the pause buffer is filled up, the oldest content may be overwritten with newer content. In some embodiments, when the pause buffer is full, the television receiver application may stop pausing the TV service and start reading content from the pause buffer. In some embodiments, when the tuner device is connected to an electronic device, the tuner device may notify the television receiver application running on the electronic device of the amount of storage currently available on the tuner device. Since the television receiver application knows the size of data being stored by the tuner device, the television receiver application may keep track of the available storage on the tuner device by subtracting from the available storage when data is stored on the tuner device, and adding to the available storage when data is read from the tuner device. Accordingly, the television receiver application is able to keep track of the amount of available space in the pause buffer and, when to start reading from the pause buffer when the pause buffer is full.

The process proceeds from step S1004 to step S1006 where the television receiver application determines whether a resume TV service command is detected. For example, when a TV service has been paused by the user, the user may press a play button on the electronic device to resume playback of the TV service. If no resume TV service command is detected, the process proceeds to step S1008 where playback of the TV service remains paused, and the process returns to step S1006.

If the resume TV program command is detected, the process proceeds to step S1014 where the television receiver application resumes reading content from the tuner device memory such as from the pause buffer. For example, access to files in the persistent storage (either persistent storage 280A inside the tuner device, or flash storage 200B) may use standard USB protocols to access files stored in the file system implemented in the storage device. The television receiver application, by processing the signaling tables (e.g., media presentation description files), knows the names of the media files that the television receiver application needs to play back content from the desired playback location (e.g., amount of delay). The television receiver application may fetch the media files from a file system by file name and directory path. In some embodiments, a stream_read( ) command may be implemented in which the television receiver application requests the tuner device to send a stream of ALP packets across the interface after the tuner device has first delayed them by a specified amount in a memory buffer (e.g., pause buffer), as an implementation of the pause functionality.

The process proceeds to step S1008 where the television receiver application resumes playback of the paused TV service. The process illustrated in FIG. 10 may be repeated each time the user is provided an ATSC 3.0 service (e.g., TV service) for viewing and initiates PVR functionality (e.g., pausing and resuming viewing of TV service).

In some embodiments, a tuner device stores data packets for each service included in a digital broadcast signal. For example, when a user selects Service A for viewing, the digital broadcast signal including Service A may also include Services B and C. When the tuner device receives the digital broadcast signal containing the multiple services, the tuner device may start storing data packets for each of these services in the memory of the tuner device. While the user is viewing Service A, the user may perform time-shift playback on Service A (e.g., rewind operation) that causes the television receiver application to send a command to the tuner device to retrieve packets for the requested time-shifted playback. For example, if a user starts watching Service A at 7:30, at 7:35 the user may initiate a rewind operation that causes data packets corresponding to Service A at 7:30 to be retrieved and forwarded to the television receiver application.

Furthermore, while the user is watching Service A, the user may initiate a change to Service B, which causes the television receiver application to send a command to the tuner device to retrieve and forward data packets corresponding to Service B from the memory of the tuner device. For example, when the user starts watching Service A at 7:30, the user may initiate a channel change for Service B at 7:35, where data packets corresponding to Service B at 7:35 are retrieved and forwarded to the television receiver application, thereby enabling the user to start watching Service B at 7:35.

Furthermore, after initiating a change to another service, the user may also perform time-shifted playback of the another service. For example, after the user initiates a change from Service A and starts watching Service B at 7:35, the user may desire to rewind Service B from 7:35 to 7:30. Accordingly, the user may initiate a rewind operation that causes data packets corresponding to Service B at 7:30 to be retrieved from the memory of the tuner device and forwarded to the television receiver application.

Figure 11:
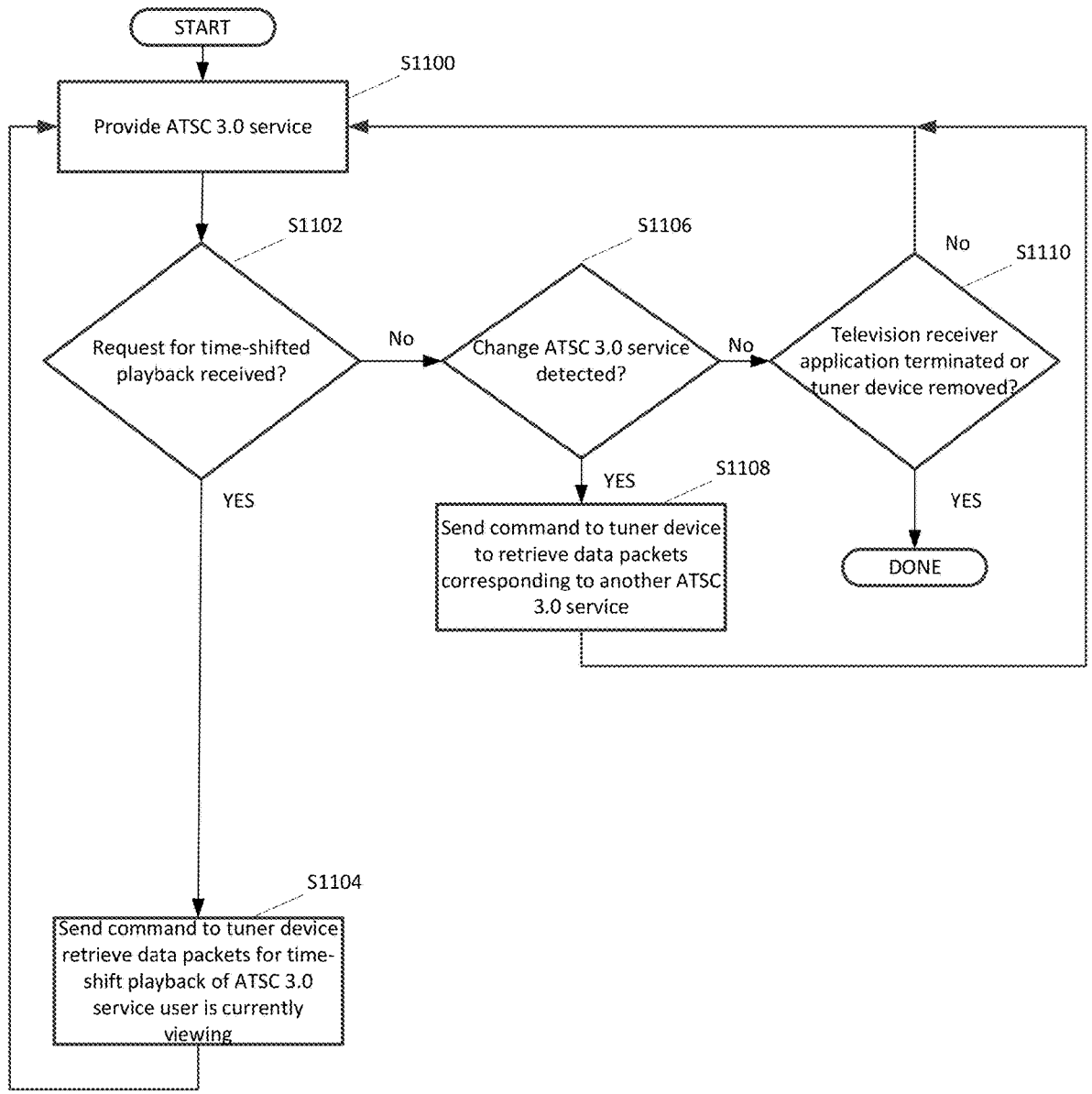
FIG. 11 is an exemplary flowchart of a process for providing PVR functionality with a tuner device that stores multiple services.

FIG. 11 illustrates an embodiment of a process performed by the television receiver application for providing PVR functionality with a tuner device that stores multiple services. The process may generally start at step S1100 where the television receiver application provides an ATSC 3.0 service. For example, the user may start watching Service A, which is received in a broadcast signal that also includes Services B and C, each of which are stored in the memory of the tuner device.

The process proceeds to step S1102 where the television receiver application determines whether a request for time-shifted playback is received. For example, while the user is watching Service A, the user may initiate a time-shifted playback operation such as a rewind operation (e.g., rewind Service A from 7:35 to 7:30) or a fast forward operation (e.g., fast forward Service A from 7:30 to 7:35).

If the request for time-shifted playback is received, the process proceeds to step S1104 where the television receiver application retrieves data packets for time-shift playback of the ATSC 3.0 service the user is currently viewing. The television receiver application knows what files to fetch because the television receiver application knows the content that the user desires to view and the timing of the content (e.g., how much delay from real-time). Once the television receiver application retrieves the data packets from the tuner device, the time-shifted playback of the ATSC 3.0 service that the user is currently watching may be implemented. The process returns from step S1104 to step S1100.

Returning to step S1102, if no request for time-shifted playback is received, the process proceeds to step S1106 where the television receiver application determines whether a request to change to another ATSC 3.0 service is detected. For example, while the user is watching Service A, the user may request to switch to another service that is stored in the memory of the tuner device (e.g., Service B). If the request to change to another ATSC 3.0 service is detected, the process proceeds to step S1108 to retrieve data packets corresponding to the another ATSC 3.0 service (e.g., change from Service A to Service B). The process returns from step S1108 to step S1100 where the television receiver application provides Service B. While the user is watching Service B, the user may request time-shifted playback of Service B, where the process for time-shifted playback of a service, as discussed above (i.e., steps S1102-S1104), are repeated.

Returning to step S1106, if the request to change to another ATSC 3.0 service is not detected, the process proceeds to step S1110 where the television receiver application determines whether a request to terminate the television receiver application is received or whether removal of the tuner device is detected. If these conditions are not detected, the process returns to step S1100. However, if any one of these conditions is detected, the process illustrated in FIG. 11 is completed.

According to some embodiments, the television receiver application is configured to record services that take place at a future time. For example, a user can view an EPG to determine that a desired service is available three hours in the future. Accordingly, the user may select an option that instructs the television receiver application to establish a task to record a certain show on a certain channel in the future, and have the tuner device wake up, tune to that service, and record for the duration of the desired service.

When the future service is recorded, time-shifted playback of the future service may be implemented in accordance with steps S1102-S1104 (FIG. 11).

Figure 12:
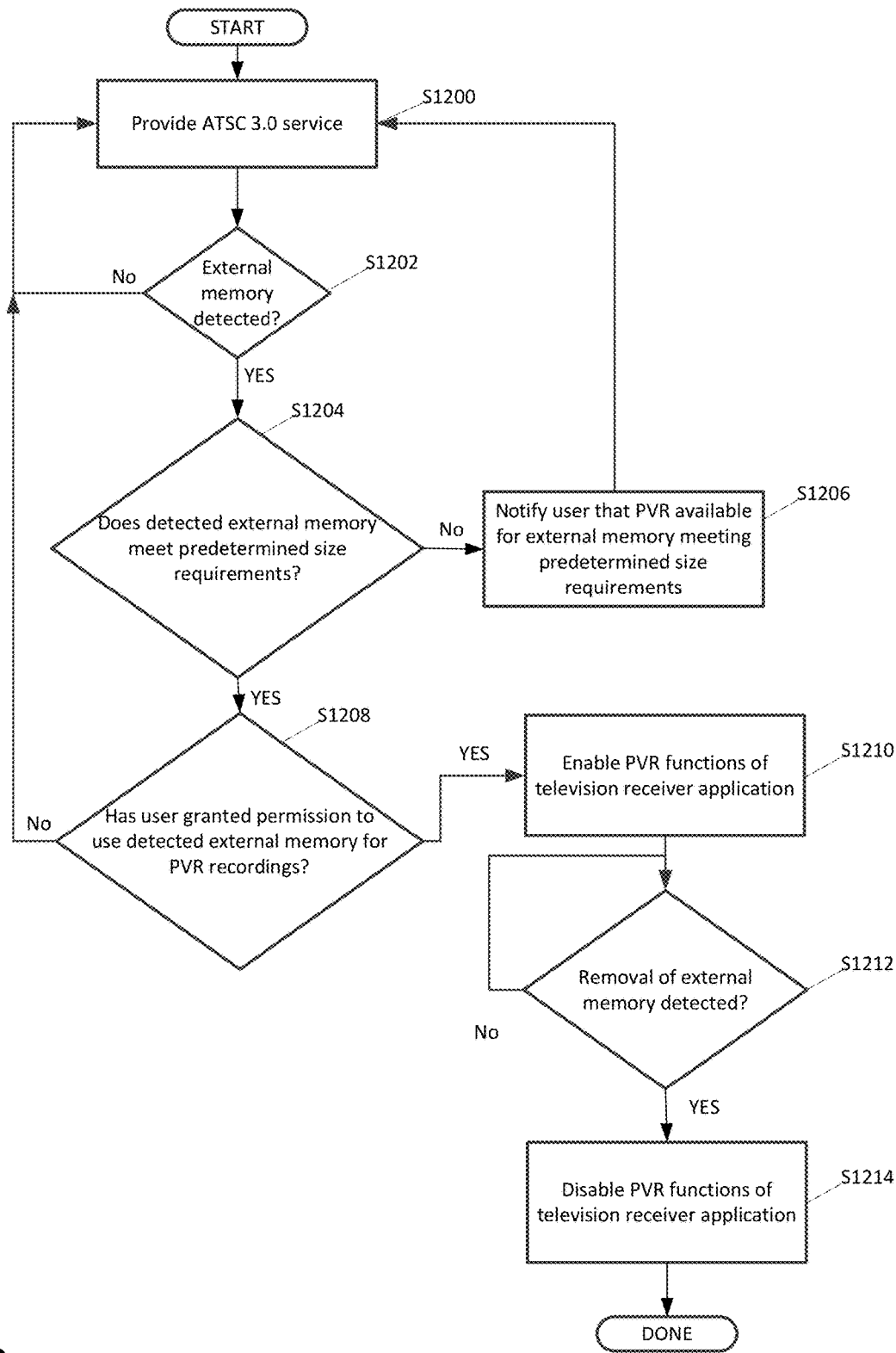
FIG. 12 is an exemplary flowchart of a process of enabling PVR functionality in response to detection of an external memory.

FIG. 12 illustrates an embodiment of a process performed by the television receiver application for enabling PVR functionality upon detection of external memory. The process illustrated in FIG. 12 may be performed when the electronic device is connected to a tuner device that does not contain persistent storage to store recordings, or when the electronic device is already capable of receiving ATSC 3.0 signals but does not contain storage to store recordings. The process may generally start at step S1200 where the television receiver application provides an ATSC 3.0 service (e.g., TV service).

The process proceeds to step S1202 where the television receiver application determines whether external memory is detected. For example, the television receiver application detects external memory when flash storage (e.g., a thumb drive) is connected to a USB port of the electronic device. If no external memory is detected, the process returns to step S1200. If external memory is detected, the process proceeds to step S1204 where the television receiver application determines whether the detected external memory meets predetermined size requirements to enable PVR functionality. For example, the television receiver application may be configured to allow PVR functionality when external memory with 32 GB or more of storage space is connected to the electronic device.

If the detected external memory does not meet the predetermined size requirements, the process proceeds from step S1204 to step S1206 where the television receiver application notifies the user that PVR functionality is available when external memory having storage space that meets the predetermined size requirements is connected to the electronic device. The process returns from step S1206 to step S1200.

If the detected external memory meets the predetermined size requirements, the process proceeds from step S1204 to step S1208 where the television receiver application determines whether the user has granted permission to use the detected external memory for PVR recordings. For example, once an external memory with enough storage space is connected to the electronic device, the user may be provided with a message that provides the user with an option to allow the external memory to be used for PVR recordings.

If the user has not granted permission to use the external memory for PVR recordings, the process returns from step S1208 to step S1200. If the user has granted permission to use the external memory for PVR recordings, the process proceeds from step S1208 to step S1210 and the television receiver application enables PVR functionality. For example, to enable PVR functionality, the television receiver application may enable certain program scripts that allow media files for a TV program to be stored in the external memory when the user pauses the TV program. When the PVR functionality is enabled, the process illustrated in FIG. 10 may be used to store media files corresponding to the TV program the user is currently viewing.

Figure 13:
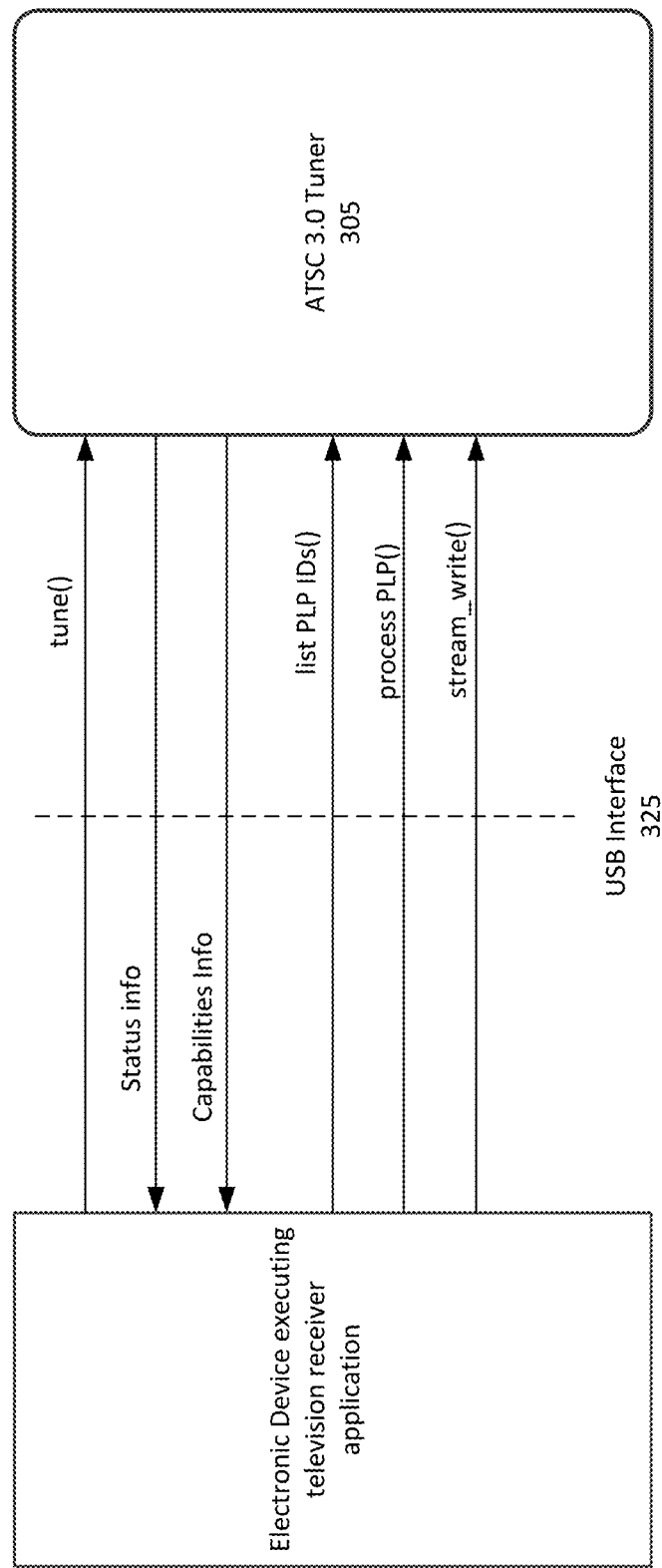
FIG. 13 is an exemplary block diagram illustrating messages passed between an information processing apparatus and a tuner device.

The process proceeds to step S1212 where the television receiver application determines whether the removal of the external memory has been detected. If the removal of the external memory has not been detected, the process remains at step S1212. If the removal of the external memory is detected, the process proceeds to step S1214 where the television receiver application disables the PVR functionality. For example, when the external memory is removed, the user may no longer be able to store media files corresponding to a TV program that the user is watching, and thus, the PVR functionality is disabled. The process illustrated in FIG. 12 is completed after step S1214. In some embodiments, if the tuner device is removed during a process of storing files in the tuner device, the television receiver application may display a notification to the user that the tuner device needs to be reconnected to complete storage of the files. In some embodiments, if the tuner device is removed while files are being read from the tuner device, the television receiver application may display a notification to the user that the tuner device needs to be reconnected to complete the reading of files from the tuner device. FIG. 13 is a block diagram illustrating an embodiment of commands and messages supported by the API provided by the tuner device and utilized by the receiver application. For example, the electronic device 200 (FIG. 2) may send, via the API, a Tune Command ("tune( )") to the tuner 305 to tune to a given 6 MHz RF frequency band to look for either an ATSC 1.0 and/or an ATSC 3.0 broadcast signal. The tuner device 305 may send, via the API, a status indication (e.g., "Status Info") to the electronic device 200 to indicate the status of reception, including what type of signal has been acquired if any (e.g., ATSC 1.0 or ATSC 3.0), an indication as to the signal strength, and whether a TV broadcast signal has been found.

The tuner device 305 may further send, via the API, a capabilities message (e.g., "Capabilities Info") to the electronic device to indicate the capabilities of the tuner device. For example the capabilities message may indicate whether the tuner device 305 supports channel bonding (e.g. whether or not the tuner device includes multiple tuner functions that can be independently controlled, and used to bond PLPs according to the ATSC standards). The electronic device 200 may further send, via the API when an ATSC 3.0 signal has been acquired, a command (e.g., "list PLP IDs( )") to the tuner device 305 to list the PLP ID values of PLPs containing LLS. The electronic device 200 may further send, via the API, a process PLP Command ("process PLP( )") to the tuner device 305 to process one or more PLPs (typically, a maximum of four), where the PLPs to be processed are identified by their PLP ID values.

The tuner device 305 streams either ALP or IP packets across the USB interface for each PLP chosen for processing. If IP packets are streamed, then the API may include additional commands to handle the communication of LMT data. For example, the API may include a request LMT command from the television receiver application to the tuner device 305 to request LMT data. Furthermore, the API may include a notification from the tuner device 305 to the television receiver application that new LMT data is available.

The API may further enable PVR functionality between the television receiver application and the tuner device. For example, the API may include stream_write( ) commands that enable the television receiver application to instruct the tuner device to store specified IP packet streams corresponding to a TV service the tuner is currently accessing, or services that the user is not currently accessing (e.g., additional services provided with the selected service in a received digital broadcast signal). The stream_write( ) command may further specify ALP packets or files to be stored in the memory of the tuner device. By using the stream_write( ) command, the television receiver application can avoid having the same IP or ALP packet being delivered across the interface to the electronic device and back into the flash storage (e.g., persistent storage in the tuner device). In other embodiments, the stream_write( )

command could be designed to allow specified IP or ALP packets to be saved. In yet other embodiments, the stream_write( ) command could be configured to cause all ALP packets currently being received by the tuner to be stored in flash storage, in which case services other than the one the user is currently watching would be buffered. If the user were to switch to one of these other services, they could be given the option to view some amount of previously-broadcast content on that service.

Figure 14:
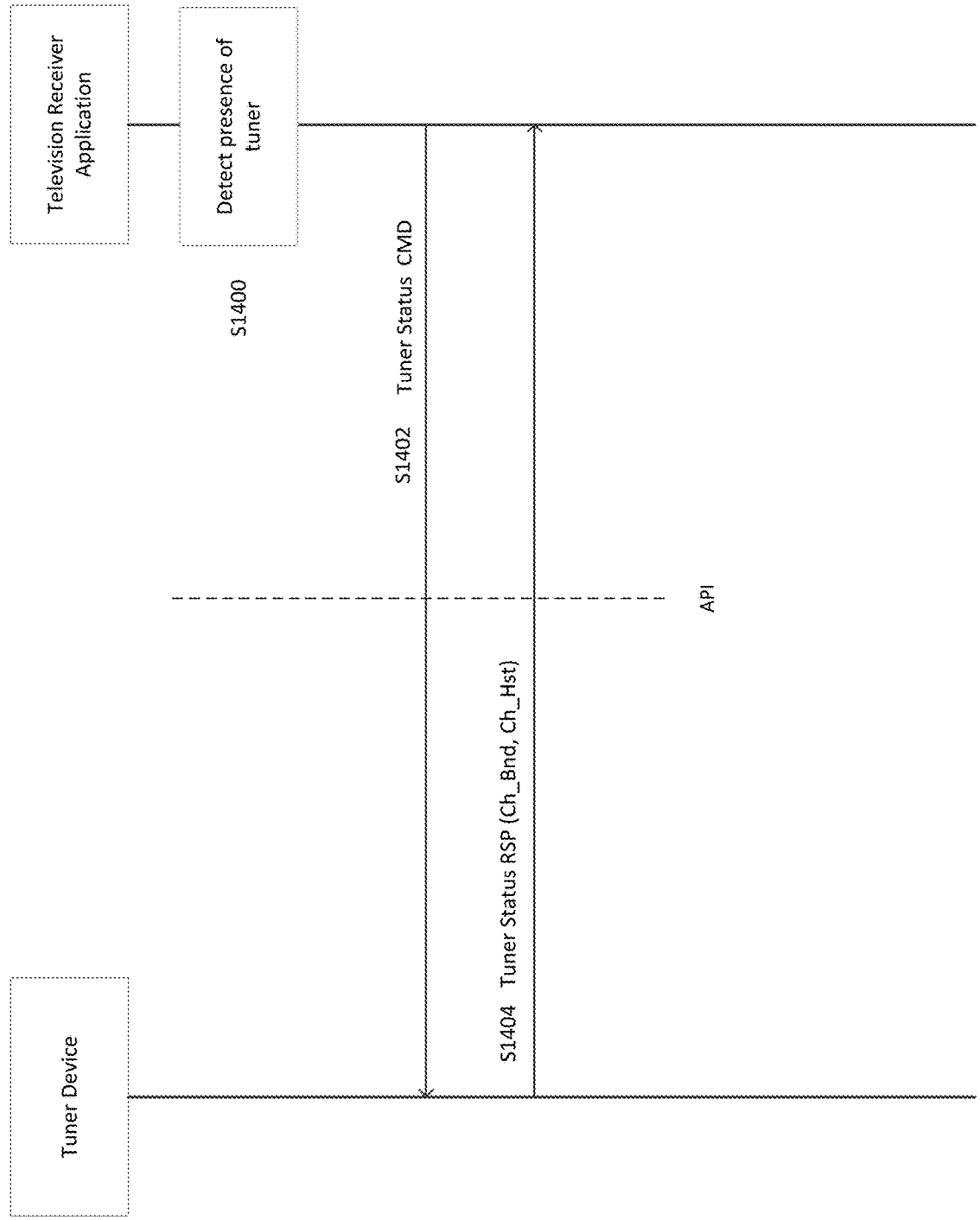
FIGS. 14-17 illustrate exemplary sequence diagrams illustrating messages transmitted between an electronic device and a tuner device via an application programming interface (API).

FIG. 14 illustrates a sequence diagram of an embodiment of a process performed between the television receiver application and the tuner device using the API. In this regard, commands and messages transmitted between the television receiver application and the tuner device are passed through the API.

The process illustrated in FIG. 14 may take place when the television receiver application is launched or the tuner device is initially connected to the electronic device. In step S1400, the television receiver application detects the presence of a tuner. For example, the electronic device may execute a USB interface function, which may be native to the electronic device's OS, in which newly connected devices are detected and registered. The television receiver application may use an API within the electronic device's native OS to determine what kind of device(s) is/are connected to the electronic device. In some embodiments, the electronic device determines whether a compatible tuner is present. The tuner device, when it is plugged in, may register its presence to the electronic device. This type of registration may occur at power-up of the electronic device.

In step S1402, upon learning of the presence of the tuner device, the television receiver application sends a tuner status command via the API to the tuner device. In step S1404, the tuner device sends the tuner status response via the API to the electronic device. In some embodiments, the tuner status response can include parameters such as a channel bonding (Ch_Bnd) parameter indicating whether channel bonding is supported, and a channel history (Ch_Hst) parameter providing a last tuned channel of the tuner device. The Ch_Hst parameter may also be a null value indicating that no channel history exists. In some embodiments, the Ch_Hst parameter is stored in the electronic device instead of being provided by the tuner device.

Figure 15:
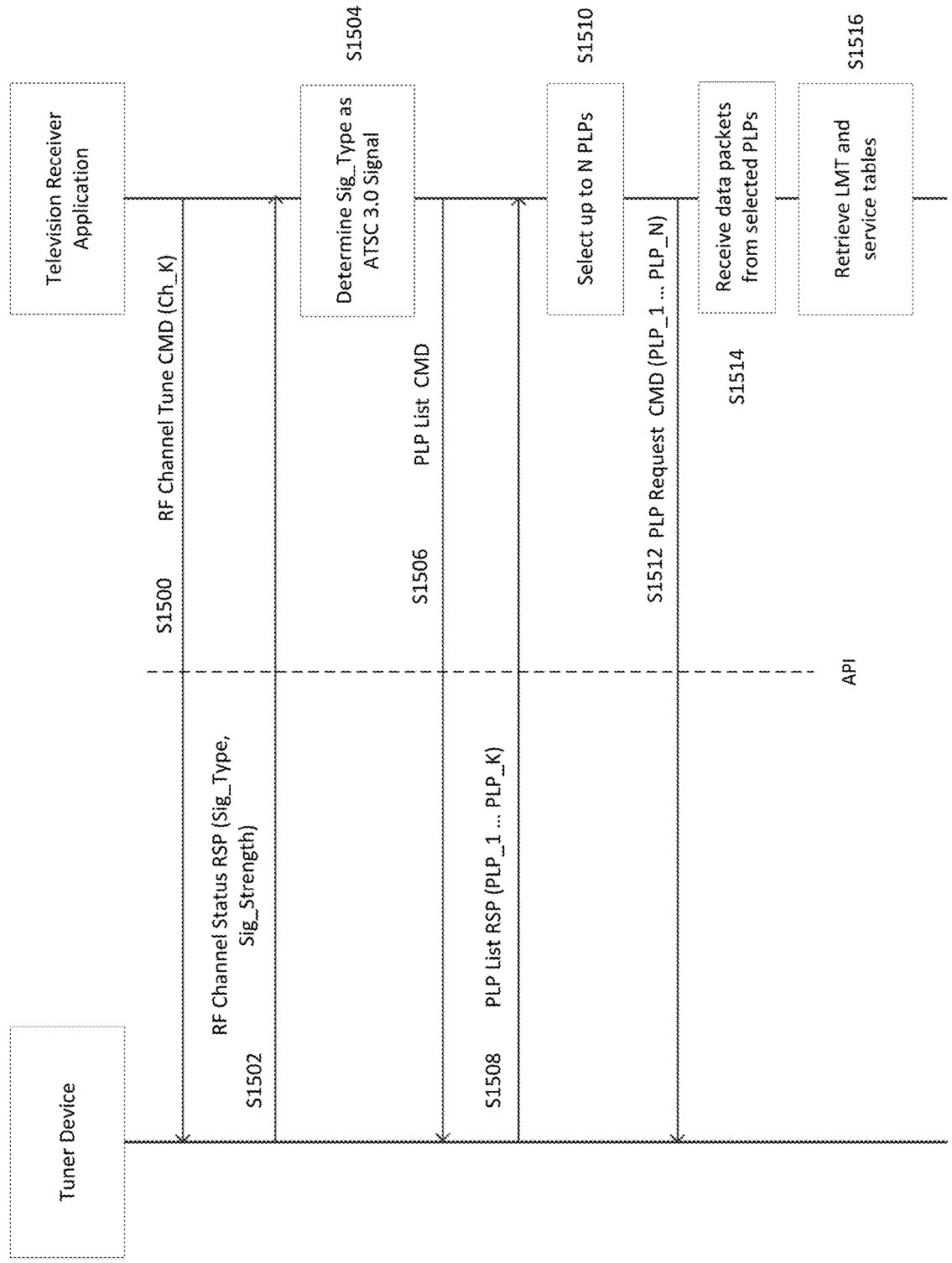

FIG. 15 illustrates an example sequence diagram of an embodiment of a process performed between the television receiver application and the tuner device in which commands and messages are passed through the API. The process in FIG. 15 may take place after the electronic device learns of the presence of the tuner device.

In step S1500, the television receiver application issues an RF channel tune command via the API to the tuner device. The RF channel tune command can include a parameter Ch_K, which may be an RF channel that the tuner is instructed to tune to. As an example, when the television receiver application has a record of the last tuned channel, Ch_K may represent the last tuned channel. However, if the television receiver application is performing a channel scan, Ch_K may represent the lowest 6 MHz RF channel.

In step S1502, the tuner device sends an RF channel status response. This response may include a signal type parameter (Sig_Type) indicating whether an ATSC 1.0 signal or an ATSC 3.0 signal (or neither) is found and a signal strength parameter (Sig_Strength). In step S1504, the television receiver application determines that the ATSC 3.0 signal is found. In step S1506, the television receiver application issues a PLP list command via the API to the tuner device. In step S1508, the tuner device provides a PLP list response command that includes a list of PLPs (e.g., PLP_1 to PLP_k). As an example, the PLPs listed in the PLP list response command are PLPs that include LLS.

In step S1510, the television receiver application examines the list of PLPs provided from the tuner device and selects up to N PLPs that contain LLS. The number of selected PLPs may be a predetermined number such as four. In step S1512, the television receiver application issues a PLP request command that includes the list of PLPs selected in step S1510 (e.g., PLP_1 to PLP_N). In step S1514, the television receiver application receives data packets from the selected PLPs. The tuner device may stream the data packets across a communication path different than the API illustrated in FIG. 15. In some embodiments, the tuner device sends ALP data packets in S1514. If the tuner device is configured to convert ALP packets to IP packets, the tuner device can send IP packets that include the LMT. In step S1516, the television receiver application examines the received data packets to retrieve at least a LMT and one or more SLTs.

Figure 16:
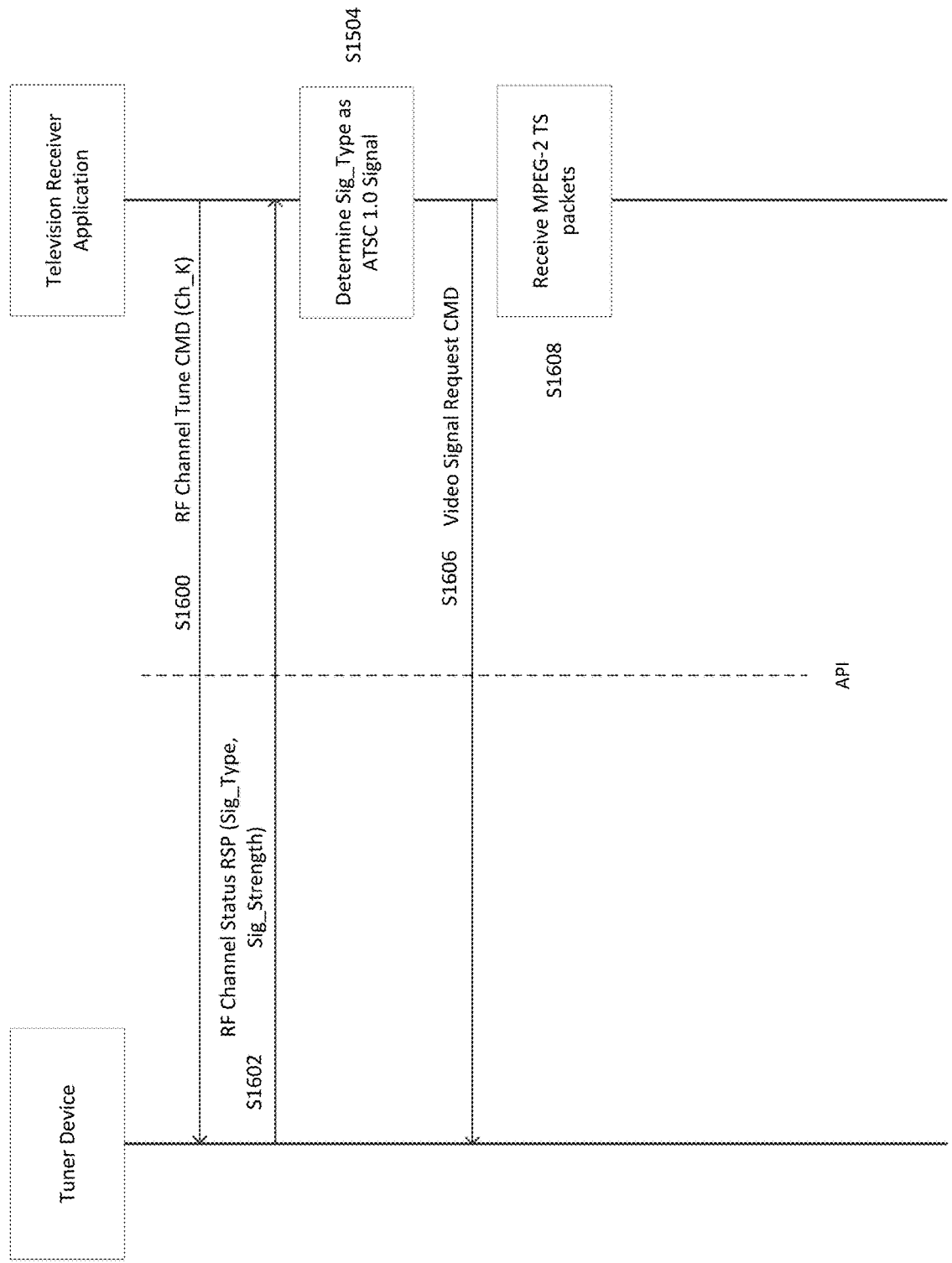

FIG. 16 illustrates an example sequence diagram of an embodiment of a process performed between the electronic device executing the television receiver application and the tuner device. This process may be performed when the tuner device detects an ATSC 1.0 signal. Steps S1600 and S1602 correspond to steps S1500 and S1502 in FIG. 15, respectively. In step S1604, the television receiver application examines the signal type parameter (Sig_Type) provided in step S1602 and determines that the ATSC 1.0 signal was received. In step S1606, the television receiver application issues a video signal request command via the API to the tuner device. In step S1608, the television receiver application receives MPEG-2 TS packets (Video_Stream). The MPEG-2 TS packets may be received across a communication path other than the API illustrated in FIG. 16.

Figure 17:
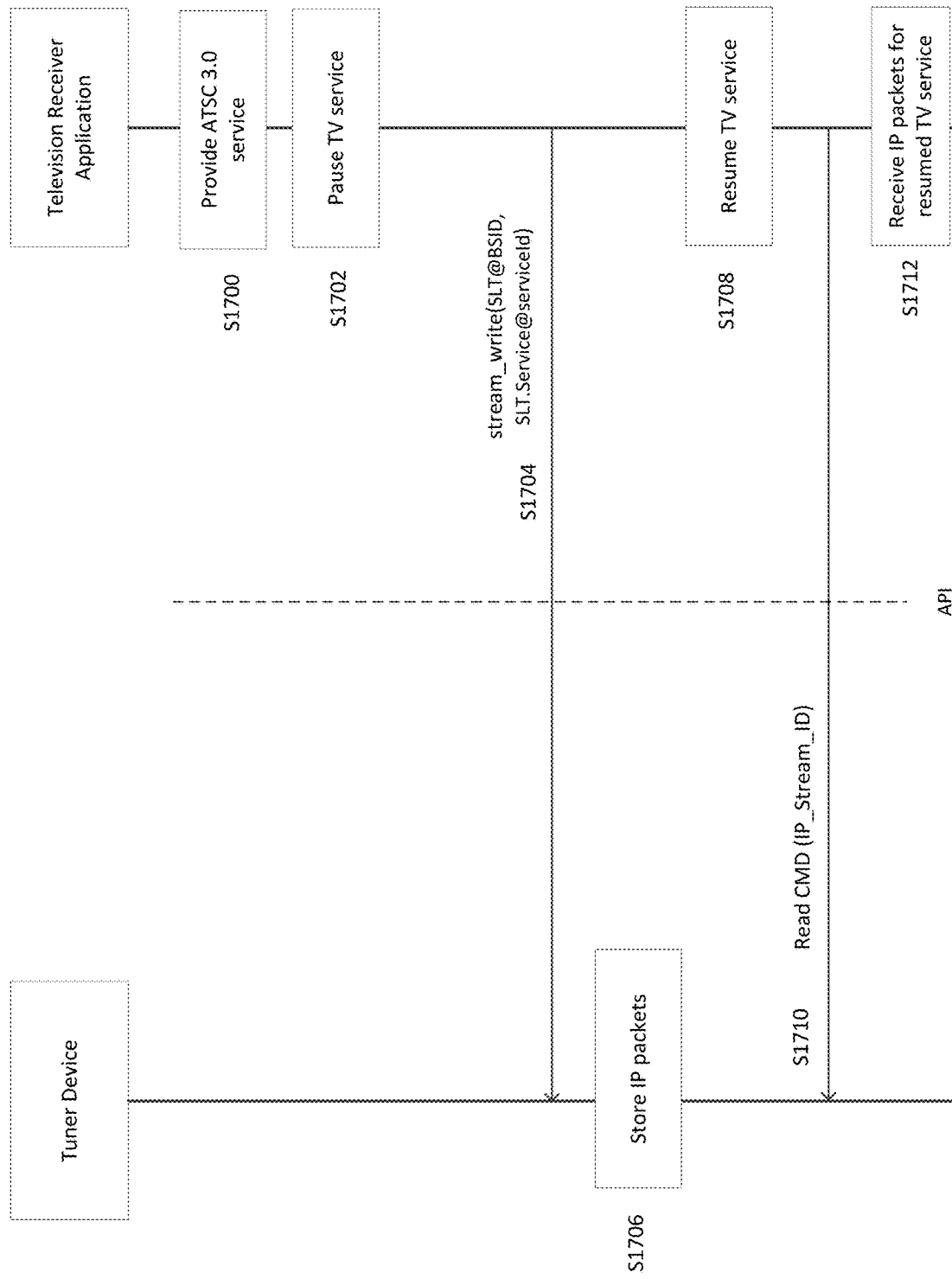

FIG. 17 illustrates an example sequence diagram of an embodiment of a process performed between the electronic device executing the television receiver application and the tuner device (e.g., tuner device 200A, FIG. 2B). This process may be performed when the television receiver application provides an ATSC 3.0 service (e.g., TV program) at step S1700. In step S1702, the television receiver application detects a pause TV service command (e.g., user presses pause button).

In step S1704, the television receiver application sends a stream_write( ) command, via the API, to the tuner device. The stream_write( ) command may specify specific files associated with the service that the tuner is currently accessing (e.g., SLT@BSID, SLT.Service@serviceId). The specific files may also be identified by a given IP address/port/transport session ID (TSI), and transport object ID (TOI). The parameters provided in the stream_write( ) command may reference all files and data associated with an identified service, or it may reference specific files (e.g., those files associated with one video track and one audio track). The parameters may reference files by their associated Layered Coding Transport (LCT) channels by means of IP address, IP port, and TSI value. In step S1706, in response to receiving the stream_write( ) command, the tuner device stores files corresponding to the requested criteria in the persistent storage of the tuner device.

In step S1708, the television receiver application detects a resume TV service command (e.g., user presses play button). In step S1710, the television receiver application sends, via the API, a read command to the tuner device. The read command may specify media files associated with the paused TV service. In step S1712, in response to sending the read command, the television receiver application receives from the tuner device, using the standard USB file API, files corresponding to the resumed TV service.

Figure 18:
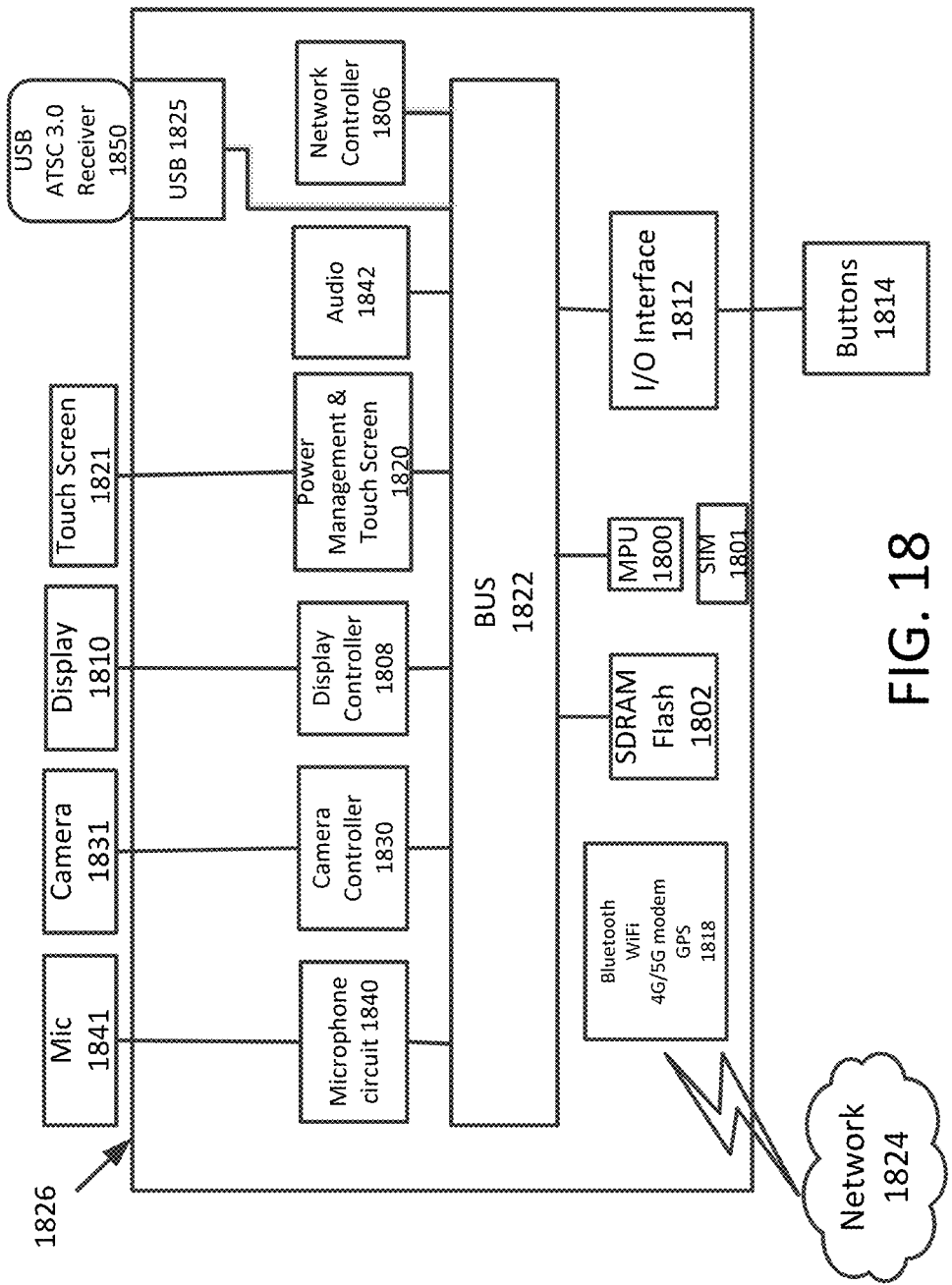
FIG. 18 illustrates an example hardware configuration of an information processing apparatus.

FIG. 18 is a block diagram showing an example of a hardware configuration of a processing circuit 1826 that can be configured to perform functions of the electronic device. In FIG. 18, the processing circuit 1826 includes a micro processing unit (MPU) 1800 which performs the processes described herein. The process data and instructions may be stored in memory 1802. These processes and instructions may also be stored on a portable storage medium or may be stored remotely. The processing circuit 1826 may have a replaceable Subscriber Identity Module (SIM) 1801 that contains information that is unique to the network service of the mobile device 121.

Further, the claimed advancements are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuit 1826 communicates, such as a server or computer.

Further, the claimed advancements may be provided as a utility application, background daemon, or component of an operating system, or combination thereof, executing in conjunction with MPU 1800 and a mobile operating system such as Android, Microsoft® Windows® 10 Mobile, Apple iOS® and other systems known to those skilled in the art.

In order to achieve the processing circuit 1826, the hardware elements may be realized by various circuitry elements, known to those skilled in the art. For example, MPU 1800 may be a Qualcomm mobile processor, a Nvidia mobile processor, an Atom® processor from Intel Corporation of America, a Samsung mobile processor, or an Apple A7 mobile processor, or may be other processor types that would be recognized by one of ordinary skill in the art. Alternatively, the MPU 1800 may be implemented on a Field-Programmable Gate Array (FPGA), Application Specific Integrated Circuit (ASIC), Programmable Logic Device (PLD) or using discrete logic circuits, as one of ordinary skill in the art would recognize. Further, MPU 1800 may be implemented as multiple processors cooperatively working in parallel to perform the instructions of the inventive processes described above.

The processing circuit 1826 in FIG. 18 also includes a network controller 1806, such as an Intel Ethernet PRO network interface card from Intel Corporation of America, for interfacing with network 1824. As can be appreciated, the network 1824 can be a public network, such as the Internet, or a private network such as LAN or WAN network, or any combination thereof and can also include PSTN or ISDN sub-networks. The network 1824 can also be wired, such as an Ethernet network. The processing circuit may include various types of communications processors for wireless communications including 3G, 4G and 5G wireless modems, WiFi®, Bluetooth®, GPS, or any other wireless form of communication that is known.

The processing circuit 1826 includes a Universal Serial Bus (USB) controller 1825 which may be managed by the MPU 1800. In one embodiment, the tuner is a hardware device in an ATSC 3.0 DTV receiver 1850 that can tune to and demodulate an ATSC 3.0 broadcast signal, and produce a sequence of ATSC 3.0 link layer protocol packets.

The processing circuit 1826 further includes a display controller 1808, such as a NVIDIA® GeForce® GTX or Quadro® graphics adaptor from NVIDIA Corporation of America for interfacing with display 1810. An I/O interface 1812 interfaces with buttons 1814, such as for volume control. In addition to the I/O interface 1812 and the display 1810, the processing circuit 1826 may further include a microphone 1841 and one or more cameras 1831. The microphone 1841 may have associated circuitry 1840 for processing the sound into digital signals. Similarly, the camera 1831 may include a camera controller 1830 for controlling image capture operation of the camera 1831. In an exemplary aspect, the camera 1831 may include a Charge Coupled Device (CCD). The processing circuit 1826 may include an audio circuit 1842 for generating sound output signals, and may include an optional sound output port.

The power management and touch screen controller 1820 manages power used by the processing circuit 1826 and touch control. The communication bus 1822, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 1826. A description of the general features and functionality of the display 1810, buttons 1814, as well as the display controller 1808, power management controller 1820, network controller 1806, and I/O interface 1812 is omitted herein for brevity as these features are well known.

While conventional electronics products have incorporated USB-connected tuners, the present disclosure enables ATSC-3.0 specific aspects. Specifically, the ATSC television receiver application of the present disclosure implements, in one or more combinable embodiments:

1. Signaling across the USB interface to identify to which digital television standard a received signal corresponds;
2. Delivery of ATSC A/330 ALP packets across the USB interface;
3. Delivery of multicast UDP/IP packets received from an IP-based digital television broadcast signal across the USB interface;
4. Delivery of Link Layer Signaling across the USB interface to allow the host to manage the selection of PLP resources in the tuner device;
5. Delivery of Link Layer Signaling data across the USB interface using a dedicated (predetermined) IP source address and port;
6. A command and control interface across the USB interface to an ATSC 3.0-capable tuner device to enable, for example, selection of PLPs for processing;
7. Commands to provide PVR functionality for an electronic device.
8. Ability to unlock latent PVR functionality in the television receiver application, where the capability is unlocked by the presence of additional nonvolatile memory.
9. A tuner device that adds both ATSC 3.0 reception capability and PVR functionality to an electronic device that did not have ATSC 3.0 reception capability or PVR functionality.
10. The storage of audio/video/caption/application data from the broadcast in the form of Internet Protocol (IP) packets or ATSC 3.0 Link layer Protocol (ALP) packets.

Numerous modifications and variations are possible in light of the above teachings. It is therefore to be understood that within the scope of the appended claims, the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) An information processing apparatus includes a communication interface configured to connect to a tuner device and processing circuitry configured to receive, from the tuner device, data packets corresponding to an Advanced Television Systems Committee (ATSC) 3.0 service included in a digital broadcast signal, determine whether an indication to pause the ATSC 3.0 service is received, and in response to a determination that the indication to pause the ATSC 3.0 service is received, stop reading, from a first memory of the tuner device, subsequent data packets corresponding to the ATSC 3.0 service.

(2) The information processing apparatus according to feature (1), in which the processing circuitry is further configured to: while the ATSC 3.0 service is paused, determine whether an indication to resume the paused ATSC 3.0 service is received, in response to the determination that the indication to resume the paused ATSC 3.0 service is received, send a read command to the tuner device that causes the tuner device to retrieve the stored subsequent data packets corresponding the paused ATSC 3.0 service, receive, from the tuner device, the retrieved subsequent data packets, and resume the paused ATSC 3.0 service using the retrieved subsequent data packets.

(3) The information processing apparatus according to feature (1) or (2), in which in response to the determination that the indication to pause the ATSC 3.0 service is received, the processing circuitry is further configured to send a write command that causes the tuner device to store the subsequent data packets in the first memory.

(4) The information processing apparatus according to feature (3), in which the write command is provided through an application programming interface that enables communication between the information processing apparatus and the tuner device.

(5) The information processing apparatus according to any one features (1)-(4), in which the processing circuitry is further configured to detect a second memory having a storage capacity larger than a storage capacity of the first memory, in response to the detection of the second memory, use the first memory and second memory to store the subsequent data packets.

(6) A tuner device including a communication interface configured to connect to an information processing apparatus; and processing circuitry configured to receive a digital broadcast stream containing an Advanced Television Systems Committee (ATSC) 3.0 service, transmit data packets corresponding to the ATSC 3.0 service to the information processing apparatus, determine whether a write command is received from the information processing apparatus, and in response to the determination that the write command is received from the information processing apparatus, store subsequent data packets corresponding to the ATSC 3.0 service in a memory.

(7) The tuner device according to feature (6), in which the processing circuitry is further configured to after reception of the write command, determine whether a read command is received from the information processing apparatus, in response to the determination that the read command is received from the information processing apparatus, retrieve the subsequent data packets corresponding to the ATSC 3.0 service from the memory, and transmit the retrieved subsequent data packets to the information processing apparatus.

(8) The tuner device according to feature (6) or (7), in which the read command is provided through an application programming interface that enables communication between the information processing apparatus and the tuner device.

(9) An information processing apparatus including a communication interface configured to connect to a tuner device and processing circuitry configured to receive, from the tuner device, data packets corresponding to a selected Advanced Television Systems Committee (ATSC) 3.0 service included in a digital broadcast signal, determine whether a user input for retrieval of data packets from a memory of the tuner device is received, and in response to a determination that the user input is received, send a command to the tuner device that causes the tuner device to retrieve, from the memory of the tuner device, data packets corresponding to the user input.

(10) The information processing apparatus according to feature (9), in which the user input corresponds to a time-shifted playback operation for the selected ATSC 3.0 service, and in which in response to the time-shifted playback operation, the tuner device retrieves data packets for the selected ATSC 3.0 for a time period corresponding to the time-shifted playback operation.

(11) The information processing apparatus according to feature (10), in which the time-shifted playback operation is a rewind operation.

(12) The information processing apparatus according to feature (10), in which the time-shifted playback operation is a forward operation.

(13) The information processing apparatus according to any one of features (9)-(12), in which the digital broadcast signal includes a plurality of ATSC 3.0 services including the selected ATSC 3.0 service, the user input corresponds to a change ATSC 3.0 service that causes the processing circuitry to change from the selected ATSC 3.0 service to another ATSC 3.0 service, and in response to the change ATSC 3.0 service, the tuner device retrieves data packets for the another ATSC 3.0 service.

(14) The information processing apparatus according to feature (13), in which the processing circuitry is further configured to receive another user input corresponding to a time-shifted playback operation for the another ATSC 3.0 service, and in response to the time-shifted playback operation, the tuner device retrieves data packets for the selected ATSC 3.0 for a time period corresponding to the time-shifted playback operation.

(15) An information processing apparatus including a communication interface configured to connect to a memory device and processing circuitry configured to display an Advanced Systems Television Committee (ATSC) 3.0 service provided in a digital broadcast stream, detect the memory device, in response to the detection of the memory device, determine whether the memory device has a storage capacity that is equal to or greater than a memory threshold, in response to the determination that the storage capacity of the detected memory is equal to or greater than the memory threshold, determine whether a user has granted permission to use the memory for personal video recordings of data packets corresponding to the ATSC 3.0 service, and in response to the determination that the user has granted permission for the personal video recordings, enable the personal video recordings of the data packets corresponding to the ATSC 3.0 service using the memory.

(16) The information processing apparatus according to feature (15), in which in response to the determination that the storage capacity of the memory is not equal to or greater than the memory threshold, notify the user that personal video recordings are available for another memory having a storage capacity equal to or greater than the memory threshold.

(17) The information processing apparatus according to feature (15) or (16), after the personal video recordings is enabled, the processing circuitry is further configured to determine whether the memory is removed from the communication interface, and in response to the determination the memory is removed from the communication interface, disable the personal video recordings of the data packets corresponding to the ATSC 3.0 service.

(18) A non-transitory computer readable medium having instructions stored therein, which when executed by a processor in an information processing apparatus causes the processor to execute a method including receiving, from a tuner device connected via a communication interface to information processing apparatus, data packets corresponding to an Advanced Television Systems Committee (ATSC) 3.0 service included in a digital broadcast signal, determining whether an indication to pause the ATSC 3.0 service is received, and in response to a determination that the indication to pause the ATSC 3.0 service is received, stop reading, from the tuner device, subsequent data packets corresponding to the ATSC 3.0 service.

(19) A non-transitory computer readable medium having instructions stored therein, which when executed by a processor in an information processing apparatus causes the processor to execute a method including receiving, from a tuner device connected via a communication interface to information processing apparatus, data packets corresponding to a selected Advanced Television Systems Committee (ATSC) 3.0 service included in a digital broadcast signal, determining whether a user input for retrieval of data packets from a memory of the tuner device is received, and in response to a determination that the user input is received, send a command to the tuner device that causes the tuner device to retrieve, from the memory of the tuner device, data packets corresponding to the user input.

(20) A non-transitory computer readable medium having instructions stored therein, which when executed by a processor in an information processing apparatus causes the processor to execute a method including displaying an Advanced Systems Television Committee (ATSC) 3.0 service provided in a digital broadcast stream, detecting a memory device connected to the information processing apparatus via a communication interface, in response to the detection of the memory device, determining whether the memory device has a storage capacity that is equal to or greater than a memory threshold, in response to the determination that the storage capacity of the detected memory is equal to or greater than the memory threshold, determine whether a user has granted permission to use the memory for personal video recordings of data packets corresponding to the ATSC 3.0 service, and in response to the determination that the user has granted permission for the personal video recordings, enabling the personal video recordings of the data packets corresponding to the ATSC 3.0 service using the memory.

The invention claimed is:

1. An external tuner device comprising:
a communication interface configured to connect the external tuner device to an information processing apparatus;
processing circuitry configured to:
receive a digital broadcast stream containing an Advanced Television Systems Committee (ATSC) 3.0 service,
transmit, via the communication interface, data packets corresponding to the ATSC 3.0 service to a television receiver application executed on the information processing apparatus,
determine whether a write command is received, via the communication interface, from the television receiver application executed on the information processing apparatus via the communication interface, and
in response to a determination that the write command is received from the television receiver application executed on the information processing apparatus, store subsequent data packets corresponding to the ATSC 3.0 service in a memory, the subsequent data packets being identified based on at least one parameter included in the write command received from the television receiver application, the at least one parameter including an attribute value of the ATSC 3.0 service in a service list table included in low level signaling of the digital broadcast stream.

2. The external tuner device according to claim 1, wherein the processing circuitry is further configured to:
after reception of the write command, determine whether a read command is received from the television receiver application executed on the information processing apparatus via the communication interface,
in response to a determination that the read command is received from the television receiver application executed on the information processing apparatus, retrieve the subsequent data packets corresponding to the ATSC 3.0 service from the memory, and
transmit, via the communication interface, the retrieved subsequent data packets to the information processing apparatus.

3. The external tuner device according to claim 2, wherein the read command is provided through an application programming interface that enables communication between the television receiver application executed on the information processing apparatus and the external tuner device.

4. The external tuner device according to claim 1, wherein the communication interface is a Universal Serial Bus (USB) interface.

5. The external tuner device according to claim 1, further comprising:
the memory.

6. The external tuner device according to claim 1, wherein the write command is a stream write command.

7. The external tuner device according to claim 1, wherein the at least one parameter identifies at least one of a broadcast stream identifier (BSID) or a service identifier included in the service list table.

8. The external tuner device according to claim 1, wherein the at least one parameter includes an IP address associated with the subsequent data packets.

9. The external tuner device according to claim 1, wherein the subsequent data packets are ATSC link layer protocol (ALP) packets or IP packets contained in the ALP packets.

10. The external tuner device according to claim 1, wherein the processing circuitry is configured to:
receive a physical layer pip (PLP) request command that identifies at least one PLP in the digital broadcast stream from the television receiver application, and
transmit the data packets from the at least one PLP identified in the PLP request command.

11. A system comprising:
an information processing apparatus including
a first communication interface, and
first processing circuitry configured to
execute a television receiver application,
receive data packets corresponding to an Advanced Television Systems Committee (ATSC) 3.0 service from an external tuner device via the first communication interface, and
transmit a write command from the television receiver application to the external tuner device via the first communication interface; and
the external tuner device including
a second communication interface, and
second processing circuitry configured to
receive a digital broadcast stream containing the ATSC 3.0 service,
transmit, via the second communication interface, the data packets corresponding to the ATSC 3.0 service to the television receiver application executed on the information processing apparatus,
determine whether the write command is received from the television receiver application executed on the information processing apparatus via the second communication interface, and
in response to a determination that the write command is received from the television receiver application executed on the information processing apparatus, store subsequent data packets corresponding to the ATSC 3.0 service in a memory, the subsequent data packets being identified based on at least one parameter included in the write command received from the television receiver application, the at least one parameter including an attribute value of the ATSC 3.0 service in a service list table included in low level signaling of the digital broadcast stream.

12. The system according to claim 11, wherein the second processing circuitry is further configured to:
after reception of the write command, determine whether a read command is received from the television receiver application executed on the information processing apparatus via the second communication interface,
in response to a determination that the read command is received from the television receiver application executed on the information processing apparatus, retrieve the subsequent data packets corresponding to the ATSC 3.0 service from the memory, and
transmit, via the second communication interface, the retrieved subsequent data packets to the information processing apparatus.

13. The system according to claim 12, wherein the read command is provided through an application programming interface that enables communication between the television receiver application executed on the information processing apparatus and the external tuner device.

14. The system according to claim 11, wherein the first and the second communication interfaces are Universal Serial Bus (USB) interfaces.

15. The system according to claim 11, wherein the external tuner device further includes the memory.

* * * * *